United States Patent
Kang et al.

(10) Patent No.: US 11,569,532 B2
(45) Date of Patent: Jan. 31, 2023

(54) AQUEOUS SECONDARY BATTERY

(71) Applicant: Seoul National University R&DB Foundation, Seoul (KR)

(72) Inventors: Kisuk Kang, Seoul (KR); Myeong Hwan Lee, Sokcho-si (KR); Sung Joo Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 102 days.

(21) Appl. No.: 16/811,204

(22) Filed: Mar. 6, 2020

(65) Prior Publication Data
US 2021/0257675 A1    Aug. 19, 2021

(30) Foreign Application Priority Data
Feb. 14, 2020    (KR) .................. 10-2020-0018298

(51) Int. Cl.
*H01M 4/58*    (2010.01)
*H01M 4/62*    (2006.01)
(Continued)

(52) U.S. Cl.
CPC ............. *H01M 10/36* (2013.01); *C01B 11/18* (2013.01); *C01D 9/00* (2013.01); *H01M 4/5825* (2013.01);
(Continued)

(58) Field of Classification Search
None
See application file for complete search history.

(56) References Cited

U.S. PATENT DOCUMENTS

2009/0253025 A1* 10/2009 Whitacre ............... H01G 11/06
                                                              429/188
2018/0277903 A1      9/2018 Xu et al.

FOREIGN PATENT DOCUMENTS

JP        2011-086402      4/2011
KR        20140023908      2/2014
(Continued)

OTHER PUBLICATIONS

Chen, M., Hua, W., Xiao, J. et al. NASICON-type air-stable and all-climate cathode for sodium-ion batteries with low cost and high-power density. Nat Commun 10, 1480 (2019). (Year: 2019).*
PubChem Compound Summary for Sodium sulfate decahydrate. Webpage. National Center for Biotechnology Information. Retrieved on Jul. 29, 2021. Retrieved from the Internet: https://pubchem.ncbi.nlm.nih.gov/compound/Sodium-sulfate-decahydrate (Year: 2021).*
(Continued)

*Primary Examiner* — Brian R Ohara
*Assistant Examiner* — Emily Elizabeth Freeman
(74) *Attorney, Agent, or Firm* — Lex IP Meister, PLLC

(57) ABSTRACT

An aqueous secondary battery including: a positive electrode; a negative electrode; a separator; and an aqueous electrolytic solution including water and a metal salt represented by Chemical Formula 1 $A_xD_y$ and having molality of about 5 M to about 40 M wherein in Chemical Formula 1, A is at least one metal ion selected from a sodium ion, a potassium ion, a magnesium ion, a calcium ion, a strontium ion, a zinc ion, or a barium ion, D is at least one type of atomic group ion selected from $Cl^-$, $SO_4^{2-}$, $NO_3^-$, $ClO_4^-$, $SCN^-$, $CF_3SO_3^-$, $C_4F_3SO_3^-$, $(CF_3SO_2)_2N^-$, $AlO_2^-$, $AlCl_4^-$, $AsF_6^-$, $SbF_6^-$, $BR_4^-$, and $PO_2F_2^-$, and $0<x\le2$, and $0<y\le2$.

7 Claims, 20 Drawing Sheets

(51) Int. Cl.
  *H01M 10/36* (2010.01)
  *H01M 4/02* (2006.01)
  *C01B 11/18* (2006.01)
  *C01D 9/00* (2006.01)

(52) U.S. Cl.
  CPC ......... *H01M 4/628* (2013.01); *C01P 2004/04* (2013.01); *C01P 2006/40* (2013.01); *H01M 2004/028* (2013.01); *H01M 2300/0005* (2013.01)

(56) References Cited

FOREIGN PATENT DOCUMENTS

| KR | 10-1693602 | 1/2017 |
| KR | 10-2017-0094424 | 8/2017 |
| KR | 10-2018-0105631 | 9/2018 |

OTHER PUBLICATIONS

PubChem Compound Summary for Sodium nitrate hydrate. Webpage. National Center for Biotechnology Information. Retrieved on Jul. 13, 2022. Retrieved from the Internet: https://pubchem.ncbi.nlm.nih.gov/compound/21736265 (Year: 2022) (Year: 2022).*
Lee et al. (Materials Today. vol. 29, 2019, pp. 26-36) (Year: 2019).*
Myeong Hwan Lee, et al., "Toward a low-cost high-voltage sodium aqueous rechargeable battery", Materials Today, vol. 29, Oct. 2019, pp. 26-36.
Liumin Suo, et al., ""Water-in-salt" electrolyte enables high-voltage aqueous lithium-ion chemistries", Science, vol. 350, Iss. 6263. Nov. 20, 2015.
Liumin Suo, et al., ""Water-in-Salt" electrolyte makes aqueous sodium-ion battery safe, green, and long-lasting", Advanced Energy Materials, 2017, 1701189.

* cited by examiner

AQUEOUS SECONDARY BATTERY

CROSS-REFERENCE TO RELATED APPLICATION

This application claims priority to and the benefit of Korean Patent Application No. 10-2020-0018298 filed in the Korean Intellectual Property Office on Feb. 14, 2020, and the entire contents of which are incorporated herein by reference.

BACKGROUND OF THE INVENTION

(a) Field of the Invention

An aqueous secondary battery is disclosed.

(b) Description of the Related Art

Recently, interest in the development of eco-friendly energy production technology and energy storage devices have been increasing to cope with problems such as global warming and environmental pollution, and demands for commercialization of lithium secondary batteries are also increasing. However, since an electrolyte system using a conventional non-aqueous solvent is weak in terms of explosion and stability, an aqueous electrolyte system (aqueous system) using water that is relatively inexpensive and stable has been in the spotlight.

However, in an aqueous electrolyte system, available voltages and electrode widths may be significantly lowered due to the inherently low decomposition voltage of water (1.23 V or less) and thus energy densities may be very low. Accordingly, there are increasing needs for an aqueous electrolyte system capable of securing a high voltage and excellent energy density as an aqueous electrolyte system that may replace a conventional organic-based solvent.

SUMMARY OF THE INVENTION

An aqueous secondary battery capable of exhibiting a high voltage, excellent energy density, and stable charge/discharge characteristics is provided.

According to an embodiment, an aqueous secondary battery includes: a positive electrode; a negative electrode; a separator; and an aqueous electrolytic solution including water and a metal salt represented by Chemical Formula 1 and having molarity of about 5 m to about 40 m.

$$A_xD_y \quad \text{[Chemical Formula 1]}$$

In Chemical Formula 1,

A is at least one metal ion selected from a sodium ion, a potassium ion, a magnesium ion, a calcium ion, a strontium ion, a zinc ion, and a barium ion, D is at least one type of atomic group ion selected from $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^+$, $AsF_6^-$, $SbF_6^-$, $BF_4^-$, and $PO_2F_2^-$, and $0<x\le 2$, and $0<y\le 2$.

The aqueous electrolyte may have ion conductivity of greater than or equal to about 40 mS/cm.

The aqueous electrolyte may include a crystalline hydrate, and the crystalline hydrate may include at least a portion of the metal ions and/or the atomic group ions that constitute a coordination with water molecules.

A mole fraction of the contact ion pair relative to the aggregated cation-anion pair of the metal ion and the atomic group ion forming the crystalline hydrate may be greater than or equal to about 50% based on a total amount of the metal ions and the atomic group ions that are ionized in the aqueous electrolyte.

The aqueous secondary battery may be at least one of a sodium secondary battery, a potassium secondary battery, a magnesium secondary battery, and a calcium secondary battery.

The positive electrode may include a positive active material including at least one of $Na_3V_2(PO_4)_3$, $Na_{1.5}VPO_5F_{0.5}$, $Na_{1.5}VPO_{4.8}F_{0.7}$, $Na_4Fe_3(PO_4)_2(P_2O_7)$, $Na_4Mn_1Fe_2(PO_4)_2(P_2O_7)$, $Na_4Mn_2Fe(PO_4)_2(P_2O_7)$, and $Na_4Mn_3(PO_4)_2(P_2O_7)$.

The negative electrode may include a negative active material including a sodium metal, a sodium metal-based alloy, a sodium insertion compound, a carbon-based material, or a combination thereof.

In the charged state of the aqueous secondary battery, a passivation film including the metal ion may be formed on the surface of the negative electrode.

The passivation film may have an average thickness of about 1 nm to about 10 nm.

The passivation film may include NaOH, $Na_2CO_3$, or a combination thereof.

An electrochemical stability window of the aqueous secondary battery obtained through cyclic voltammetry may belong to a voltage range of greater than about 1.23 V.

A width of the electrochemical stability window of the aqueous secondary battery obtained through cyclic voltammetry may be about 1 V to about 4 V.

The aqueous secondary battery according to an embodiment may exhibit a high voltage, improved energy density, and stable charge/discharge characteristics even at a relatively low cost.

DETAILED DESCRIPTION OF THE EMBODIMENTS

Figure 1:
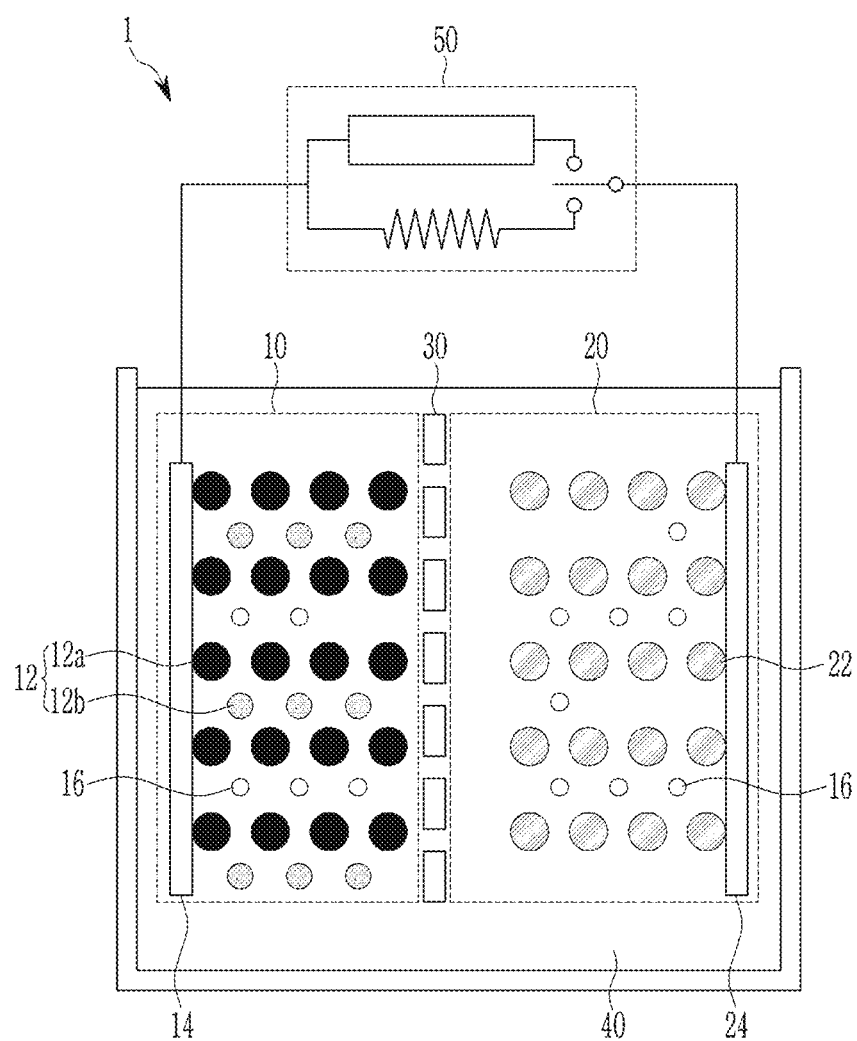
FIG. 1 is a schematic view showing a structure of an aqueous secondary battery according to an embodiment.

Hereinafter, the embodiments will be described in detail so that those skilled in the art can easily perform the embodiments. However, the present invention may be embodied in many different forms and should not be construed as limited to the embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, unless otherwise defined, the term "average" means an arithmetic mean thickness of data obtained by measuring the thickness of a measurement object observed from various microscope images several to several tens of times.

Aqueous systems have advantages in terms of stability and costs compared with non-aqueous electrolyte systems using organic solvents, but have relatively low voltages that are utilized as secondary batteries, resulting in poor energy density.

In order to improve this, there has been an attempt to control a concentration of the aqueous electrolyte system to a high concentration by dissolving a high concentration of imide-based solutes. However, this requires a large amount of relatively expensive, high concentration imide-based solutes, so it may act as a barrier in terms of commercialization and diffusion of the aqueous electrolyte system.

Therefore, the present inventors studied making the aqueous electrolyte system have a good voltage and energy density at a low cost. The present inventors found that in the case of an aqueous electrolyte system using predetermined relatively inexpensive solutes, the aqueous secondary battery has a high voltage, improved energy density, and stable charge/discharge characteristics even under relatively low concentration conditions compared with an electrolyte using imide solutes, and thus, the present invention has been completed.

FIG. 1 is a schematic view showing a structure of an aqueous secondary battery according to an embodiment.

Referring to FIG. 1, a basic structure of an aqueous secondary battery 1 according to an embodiment includes a positive electrode 10 including a positive active material 12 storing charge carrier ions 16 during discharge, and a negative electrode 20 including a negative active material 22 for storing charge carrier ions 16 during charging, a separator 30 for transferring charge carrier ions 16 between the positive electrode 10 and the negative electrode 20, and an aqueous electrolyte solution 40 including a relatively high concentration of a predetermined metal salt and using charge carrier ions 16 as a transfer medium in the positive electrode 10 and the negative electrode 20.

In an embodiment, the aqueous secondary battery 1 may be at least one of a sodium secondary battery, a potassium secondary battery, a magnesium secondary battery, and a calcium secondary battery, and the charge carrier ions 16 are at least one of sodium ions, potassium ions, magnesium ions, and calcium ions. Hereinafter, the components of the aqueous secondary battery 1, for example, a sodium secondary battery and sodium ions, will be described in more detail as examples of the aqueous secondary battery 1 and the charge carrier ions 16. However, an embodiment is not necessarily limited thereto.

The positive electrode 10 is an electrode that receives electrons from an external conductive wire and reduces the positive active material 12. The positive electrode 10 includes a positive current collector 14 that collects and sends electrons to an external conductive wire, a positive active material 12 having a structure capable of inserting and detaching charge carrier ions 16, and optionally a binder, a conductive material, and other additives.

For example, the positive active material 12 may include a sodium metal compound. The sodium metal compound may include oxygen ions 12*a* and sodium ions 12*b*.

In an embodiment, the positive active material may include at least one of $Na_3V_2(PO_4)_3$, $Na_{1.5}VPO_5F_{0.5}$, $Na_{1.5}VPO_{4.8}F_{0.7}$, $Na_4Fe_3(PO_4)_2(P_2O_7)$, $Na_4Mn_1Fe_2(PO_4)_2(P_2O_7)$, $Na_4Mn_2Fe(PO_4)_2(P_2O_7)$, and $Na_4Mn_3(PO_4)_2(P_2O_7)$. For example, the positive active material may be $Na_4Fe_3(PO_4)_2(P_2O_7)$. For example, the positive active material may further include one or more selected from $Na_3V_2(PO_4)_3$, $Na_{1.5}VPO_5F_{0.5}$, $Na_{1.5}VPO_{4.8}F_{0.7}$, $Na_4Mn_1Fe_2(PO_4)_2(P_2O_7)$, $Na_4Mn_2Fe(PO_4)_2(P_2O_7)$, and $Na_4Mn_3(PO_4)_2(P_2O_7)$ in addition to $Na_4Fe_3(PO_4)_2(P_2O_7)$.

In an embodiment, the positive active material 12 has a Na/Na+ potential measurable at pH 7 in the presence of the aqueous electrolyte solution 40 of greater than or equal to about 3 V, for example greater than or equal to about 3.1 V, greater than or equal to about 3.2 V, greater than or equal to about 3.3 V, greater than or equal to about 3.4 V, greater than or equal to about 3.5 V, greater than or equal to about 3.6 V, greater than or equal to about 3.7 V, greater than or equal to about 3.8 V, greater than or equal to about 3.9 V, greater than or equal to about 4.0 V, greater than or equal to about 4.1 V, or greater than or equal to about 4.2 V. As the concentration of the aqueous electrolyte solution 40 is increased, the Na/Na+ potential of the positive active material 12 may be increased. This will be described later.

The binder serves to well adhere the positive active material (particles) to each other, and also to well adhere the positive active material 12 to the positive current collector 14. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, polyacrylic acid, an epoxy resin, nylon, and the like, but are not limited thereto.

The conductive material is used to impart conductivity to the positive electrode 10, and any electrically conductive material may be used as a conductive material, unless it causes a chemical change in a battery. Examples thereof may be natural graphite, artificial graphite, carbon black, acetylene black, ketjen black, a carbon fiber, a metal powder or a metal fiber such as copper, nickel, aluminum silver, and the like, and one or more types of a polyphenylene derivative, an isophthalic acid derivative, and the like.

The negative electrode 20 is an electrode that discharges electrons to the conductive wire while the negative active material 22 is oxidized. The negative electrode 20 includes a negative current collector 24 which collects and sends electrons to an external conductive wire and a negative active material 22 having a structure capable of inserting and detaching charge carrier ions 16, like the positive electrode 10, and optionally a binder, a conductive material, and other additives.

For example, the negative active material 22 may include a sodium metal, a sodium metal-based alloy, a sodium insertion compound, a carbon-based material, a sulfide-based material, or a combination thereof. In an embodiment, the sodium metal-based alloy and/or sodium insertion compound include $NaTi_2(PO_4)_3$, $Mo_6S_8$, $TiS_2$, S, or a combination thereof. Examples of the carbon-based material include various organic compounds including carbon such as graphite, carbon black, hard carbon, and activated carbon.

In an embodiment, the negative active material 22 has a Na/Na+ potential measurable at pH 7 in the presence of the aqueous electrolyte solution 40 of less than or equal to about 2.2 V, less than or equal to about 2.1 V, less than or equal to about 2.0 V, less than or equal to about 1.9 V, less than or equal to about 1.8 V, or less than or equal to about 1.7 V. As the concentration of the aqueous electrolyte solution 40 is increased, the Na/Na+ potential of the negative active material 22 may be decreased. This will be described later.

The binder serves to well adhere the negative active material (particles) to each other, and also to well adhere the negative active material 22 to the negative current collector 24. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, polyacrylic acid, an epoxy resin, nylon, and the like, but are not limited thereto.

The conductive material is used to impart conductivity to the negative electrode 20, and any electrically conductive material may be used as a conductive material, unless it causes a chemical change in a battery. Examples thereof may be natural graphite, artificial graphite, carbon black, acetylene black, ketjen black, a carbon fiber, a metal powder or a metal fiber such as copper, nickel, aluminum silver, and the like, and one or more types of a polyphenylene derivative, an isophthalic acid derivative, and the like.

The aqueous electrolyte solution 40 is a medium through which mass transfer (movement of charge carrier ions 16) occurs so that reduction of the positive electrode 10 or oxidation reaction of the negative electrode 20 is chemically harmonized. In an embodiment, the aqueous electrolyte solution 40 may include water and a predetermined metal salt that may be dissolved in the water. The aqueous electrolyte solution 40 has an excellent dissociation property of metal salts by using water as a solvent, and also has a lower viscosity than conventional non-aqueous organic solvents, so that the charge carrier ions 16 may be easily transferred.

In an embodiment, the metal salt may be represented by Chemical Formula 1.

$$A_xD_y \qquad \text{[Chemical Formula 1]}$$

In Chemical Formula 1,

A is at least one metal ion selected from a sodium ion, a potassium ion, a magnesium ion, a calcium ion, a strontium ion, a zinc ion, and a barium ion, D is at least one atomic group ion selected from $Cl^-$, $SO_4^{2-}$, $NO_3^+$, $ClO_4^-$, $SCN^-$, $CF_3SO_3^-$, $C_4F_9SO_3^-$, $(CF_3SO_2)_2N^-$, $AlO_2^-$, $AlO_4^-$, $AsF_6^-$, $SbF_6^-$, $BF_4^-$, and $PO_2F_2^-$, and $0 < x \leq 2$, and $0 < y \leq 2$.

In an embodiment, the metal ion may be one of a sodium ion and a potassium ion. In an embodiment, the metal ion may be a sodium ion.

In an embodiment, the atomic group ion may be at least one selected from $ClO_4^-$, $CF_3SO_3^-$, $C_4F_9SO_3^-$, and $(CF_3SO_2)_2N^-$. In an embodiment, the atomic group ion may be at least one selected from $ClO_4^-$ and $CF_3SO_3^-$.

In an embodiment, the metal salt may be dissolved in water and ionized into metal ions and atomic group ions, respectively.

The atomic group ions may be present in a form of free ions (FA), respectively, may be present in a form of solvent-separated ion pairs (SSIP) together with metal ions, or may be present in a form of contact ion pairs (CIP), and/or aggregated cation-anion pairs (AGG).

In an embodiment, the aqueous electrolyte solution 40 may include crystalline hydrate. The crystalline hydrate may be one in which the ionized metal ions and/or atomic group ions constitute a coordination with water molecules. In an embodiment, the crystalline hydrate may suppress side reactions during a charge/discharge process of the aqueous secondary battery 1 which will be described later. More details on this will be described later.

In an embodiment, the presence of metal ions and atomic group ions dissolved in water depends on a concentration of the aqueous electrolyte solution 40. For example, until the concentration of the aqueous electrolyte solution 40 reaches a predetermined concentration, the metal ions and atomic group ions, particularly atomic group ions, are ionized and mostly exist as free ions. However, since the concentration of the aqueous electrolyte solution 40 exceeds a predetermined concentration, the metal ions and/or the atomic group ions may achieve a predetermined physical and/or chemical interaction with the water molecules that is a solvent.

For example, metal ions and/or atomic group ions that have been solvated (simply hydrated) until reaching a predetermined concentration may have an ion-aggregated structure above the predetermined concentration. That is, since the concentration of the aqueous electrolyte solution 40 exceeds a predetermined concentration, the metal ions and/or the atomic group ions destabilize bonds (e.g., hydrogen bonding networks) between water molecules that have been bulk-aggregated with each other by conventional hydrogen bonding. As a result, the aggregation of water molecules is broken and the water molecules in which the aggregation is broken have a physical and/or chemical interaction with the aforementioned metal ions and/or atomic group ions, thereby forming a crystalline hydrate different from the (simply hydrated) structure in which conventional metal ions and/or atomic group ions are simply solvated.

For example, the metal ions and/or atomic group ions included in the crystalline hydrate may be present in at least one of the aforementioned solvent-separated ion pairs, contact ion pairs, and aggregated cation-anion pairs. For example, at a relatively high concentration exceeding a predetermined concentration, the metal ions and/or atomic group ions included in the crystalline hydrate may be mainly present in a form of contact ion pairs, aggregated cation-anion pairs, or a combination thereof.

In an embodiment, based on a total amount of metal ions and atomic groups ions ionized in the aqueous electrolyte solution 40, a mole fraction (contact ion pairs/aggregated cation-anion pairs) of the contact ion pairs relative to the aggregated cation-anion pairs may be greater than or equal to about 50%, for example greater than or equal to about 55%, greater than or equal to about 60%, greater than or equal to about 65%, greater than or equal to about 70%, greater than or equal to about 75%, greater than or equal to about 80%, greater than or equal to about 85%, greater than or equal to about 90%, greater than or equal to about 95%, or even about 100%.

In an embodiment, the predetermined concentration at which the aqueous electrolyte solution 40 may form the aforementioned crystalline hydrate may be higher than that of a general aqueous and/or non-aqueous electrolyte solution. The predetermined concentration may vary depending on a specific type of the metal salt used, and molarity may be, for example, greater than or equal to about 5 m, greater than or equal to about 6 m, greater than or equal to about 7 m, greater than or equal to about 8 m, or greater than or equal to about 9 m, and for example less than or equal to about 40 m, less than or equal to about 38 m, less than or equal to about 36 m, less than or equal to about 34 m, less than or equal to about 32 m, less than or equal to about 30 m, less than or equal to about 28 m, less than or equal to about 26 m, less than or equal to about 24 m, less than or equal to about 23 m, less than or equal to about 22 m, less than or equal to about 21 m, or less than or equal to about 20 m, for example about 5 m to about 40 m, about 5 m to about 36 m, about 5 m to about 32 m, about 5 m to about 30 m, about 5 m to about 26 m, about 6 m to about 26 m, about 7 m to about 26 m, about 8 m to about 26 m, about 8 m to about 24 m, about 8 m to about 22 m, or about 8 m to about 20 m.

When the molarity of the aqueous electrolyte solution 40 is less than 5 m, it is easy to cause water decomposition due to an increase in a free ion fraction and a high proportion of free water molecules. When it exceeds 40 m, the metal salt may be precipitated by exceeding a dissolution limit, or ionic conductivity decreases as viscosity increases.

In an embodiment, the aqueous electrolyte solution 40 may exhibit relatively good ionic conductivity to compensate for the low energy density inherent in the conventional aqueous electrolyte system. For example, the ion conductivity of the aqueous electrolyte solution 40 may be greater than or equal to about 40 mS/cm, for example greater than or equal to about 45 mS/cm, greater than or equal to about 50 mS/cm, greater than or equal to about 55 mS/cm, greater than or equal to about 60 mS/cm, greater than or equal to about 65 mS/cm, greater than or equal to about 70 mS/cm, greater than or equal to about 75 mS/cm, greater than or equal to about 80 mS/cm, greater than or equal to about 85 mS/cm, greater than or equal to about 90 mS/cm, greater than or equal to about 95 mS/cm, or greater than or equal to about 100 mS/cm.

When the imide-based solute (e.g., LiTFSI) is applied to the aqueous electrolyte system, the aqueous electrolyte solution 40 according to the embodiment has improved ion conductivity as described above and thus energy density may be improved, considering that the ion conductivity of the aqueous electrolyte solution is less than or equal to about 10 mS/sm.

The separator 30 is a separating film for preventing physical contact between the positive electrode 10 and the negative electrode 20. The separator 30 has a structure having fine pores so that the charge carrier ions 16 may be transferred. The separator 30 may be used as long as it is commonly used in an aqueous secondary battery (specifically, a sodium secondary battery). That is, the separator 30 may have low resistance to ion migration of the aqueous electrolyte solution and improved electrolyte solution-wetting ability.

Examples of the separator 30 include a glass fiber, polyester, Teflon, polyethylene, polypropylene, polytetrafluoroethylene (PTFE), or a combination thereof, and the separator 30 may be non-woven fabric or woven fabric. For example, a polyolefin-based polymer separator such as polyethylene or polypropylene may be used as the separator 30 mainly applied to the aqueous secondary battery 1, and the separator may have a coating including a ceramic component or a polymer material to secure heat resistance or mechanical strength. Optionally, it may have a mono-layered or multi-layered structure.

In an embodiment, the aqueous secondary battery 1 is an electrochemical device that converts chemical energy of the internal positive electrode/negative active material into electrical energy by chemical reaction. The aqueous secondary battery 1 has a special internal structure in which an electrochemical reaction occurs to allow electrons to escape to the outside through a conductive wire, and electrons flowing through the conductive wire may be a source of electrical energy to provide electricity.

That is, as described above, the aqueous secondary battery 1 includes a positive electrode 10 that receives electrons from an external conductive wire and a positive active material 12 that is reduced, a negative electrode 20 that discharges electrons to the conductive wire and a negative active material 22 that is oxidized, an aqueous electrolyte solution 40 that is a medium in which mass transfer takes place so that the reduction reaction and oxidation reaction of the active material may be chemically harmonized, and a separator 30 for preventing physical contact between the positive electrode 10 and the negative electrode 20.

On the other hand, the negative electrode 20 of the aqueous secondary battery 1 is a material that donates electrons and is oxidized, and on the contrary, the positive electrode 10 is a material that receives electrons (with cations) and is reduced. When the aqueous secondary battery 1 is connected to an external load 50 to perform a discharge reaction, the two electrodes react with each other electrochemically to produce electrical energy. Herein, the electrons generated by the oxidation reaction of the negative electrode 20 move to the positive electrode 10 via the external rod 50, causing a reduction reaction with the positive active material 12, and the electrical circuit may be completed by the mass transfer of anions and cations in the direction of the negative electrode 20 and the positive electrode 10, respectively, in the aforementioned aqueous electrolyte solution 40.

In an embodiment, the electrochemical reaction, that is, the oxidation/reduction reaction (charge/discharge reaction), may be reversible. The electrochemical reversible reaction may proceed stably within a predetermined voltage range.

In an embodiment, the electrochemical stability window of the aqueous secondary battery 1 obtained through cyclic voltammetry may belong to a voltage range that exceeds at least 1.23 V that is a decomposition voltage of water. The electrochemical stability window refers to a voltage range capable of reversibly repeating an oxidation/reduction reaction while maintaining stable driving.

That is, the aqueous secondary battery 1 according to an embodiment may overcome a low decomposition voltage of water on the aqueous electrolyte system and implement a stable electrochemical reversible reaction (oxidation/reduction reaction) in a relatively high voltage range.

Meanwhile, in an embodiment, a width of the electrochemical stability window of the aqueous secondary battery 1 obtained through cyclic voltammetry may be at least greater than or equal to about 2 V, greater than or equal to about 2.1 V, greater than or equal to about 2.2 V, greater than or equal to about 2.3 V, greater than or equal to about 2.4 V, greater than or equal to about 2.5 V, greater than or equal to about 2.6 V, or greater than or equal to about 2.7 V, and for example less than or equal to about 4 V, less than or equal to about 3.8 V, less than or equal to about 3.6 V, less than or equal to about 3.4 V, less than or equal to about 3.2 V, or less than or equal to about 3.0 V, for example about 2 V to about 4 V, about 2 V to about 3.8 V, about 2.4 V to about 3.8 V, about 2.4 V to about 3.6 V, or about 2.4 V to about 3.4 V.

In an embodiment, when the voltage range and the width of the electrochemical stability window of the aqueous secondary battery 1 satisfies the above range, it may exhibit a stable charge/discharge characteristics while largely complementing the low voltage and energy density of the conventional aqueous electrolyte system.

In an embodiment, the aqueous secondary battery 1 satisfies the aforementioned voltage range and width of the electrochemical stable window due to the fact that the aqueous electrolyte solution 40 including the predetermined metal salt has a predetermined molarity. Specifically, the aqueous secondary battery 1 includes the crystalline hydrate in the aqueous electrolyte solution by satisfying the above conditions. When the aqueous secondary battery 1 enters a charged state, the crystalline hydrate may adhere to the surface of the negative electrode 20 to form a solid-electrolyte interphase (hereinafter referred to as SEI) film.

In an embodiment, the formed SEI film may serve to suppress various chemical side reactions (e.g., hydrogen generation reactions) that may occur at the negative electrode 20 during charging. Accordingly, even when the charge/discharge cycle is increased, the aqueous secondary battery 1 may exhibit stable charge/discharge characteristics.

In an embodiment, the SEI film may have a predetermined thickness so as to suppress side reactions in the negative electrode 20 described above. In an embodiment, an average thickness of the SEI film may be greater than or equal to about 1 nm, or greater than or equal to about 2 nm, and for example less than or equal to about 10 nm, less than or equal to about 9 nm, less than or equal to about 8 nm, less than or equal to about 7 nm, less than or equal to about 6 nm, less than or equal to about 5 nm, or less than or equal to about 4 nm, for example about 1 nm to about 10 nm, about 1 nm to about 8 nm, about 1 nm to about 6 nm, about 1 nm to about 5 nm, about 2 nm to about 5 nm, or about 3 nm to about 4 nm.

The SEI film may be a crystalline or amorphous material layer. In an embodiment, the SEI film may be an amorphous material layer.

In an embodiment, when the aqueous secondary battery 1 is a sodium secondary battery, the SEI film may include sodium ions which are metal ions derived from metal salts. An example of the material which includes the SEI film may be NaOH, $Na_2CO_3$, or a combination thereof. For example, the material constituting the SEI film may be $Na_2CO_3$.

In an embodiment, when the SEI film includes $Na_2CO_3$, $Na_2CO_3$ may be formed by reacting sodium ions with dissolved oxygen ($O_2$) and carbon dioxide ($CO_2$) included in water that is a solvent. Specifically, $Na_2CO_3$ may be formed through the following reaction sequence.

$Na^+ + O_2 + e^- \rightarrow NaO_2$  $E° = 2.27V$(vs. $Na/Na^+$)     [Reaction Scheme 1]

$2Na^+ + O_2 + 2e^- \rightarrow Na_2O_2$  $E° = 2.33V$(vs. $Na/Na^+$)    [Reaction Scheme 2]

$4Na^+ + 3CO_2 + 4e^- \rightarrow 2Na_2CO_2 + C$  $E° = 2.35V$(vs. $Na/Na^+$)    [Reaction Scheme 3]

The SEI film is not present in the initial aqueous secondary battery 1 in which the charge/discharge reaction is not performed, but may be formed through the aforementioned electrochemical reaction in the process of at least the first charge reaction.

In an embodiment, the SEI film formed once may continue to exist even after the aqueous secondary battery electrochemical reaction proceeds.

More specifically, an SEI film is generally susceptible to hydrolysis in water, and if contacted with free water in an aqueous electrolysis system, there is a possibility of hydrolysis into NAOH through the following reaction sequence.

$NaO_4 + 2H_2O \rightarrow Na^+(aq) + 4OH^-(aq)$     [Reaction Scheme 4]

$Na_2O_2 + 2H_2O \rightarrow 2Na^+(aq) + 4OH^-(aq)$    [Reaction Scheme 5]

$Na_2CO_3 + H_2O \rightarrow HCO_3^-(aq) + 2Na^+(aq) + OH^-(aq)$     [Reaction Scheme 6]

However, since the aqueous electrolyte solution 40 of the aqueous secondary battery 1 according to the embodiment breaks bonds between the bulk water molecules and forms crystalline hydrates using a relatively high concentration of a metal salt (solute), it is possible to reduce a proportion of free water in the aqueous electrolyte solution 40 while increasing a proportion of bound water. Thus, even if some of the SEI film formed once is in contact with the free water and is hydrolyzed to some NaOH and/or $Na_2CO_3$, formation and decomposition of the SEI film is chemically balanced and continues to exist on the surface of the negative electrode 20 as the charge/discharge reaction is repeated.

As described above, the aqueous secondary battery 1 according to an embodiment may exhibit a higher voltage, better energy density, and stable charge/discharge characteristics through an aqueous electrolyte solution 40 using a predetermined metal salt at a relatively high concentration as a solute, compared with a conventional non-aqueous secondary battery and/or an aqueous electrolyte system using an imide-based solute.

Specific examples of the present invention are described. However, the examples described below are merely for illustrating or explaining the present invention in detail, and thus the present invention should not be limited thereto.

EXAMPLES

Verification Examples

Aqueous electrolyte solutions were prepared using the following various metal salts as solutes, and then each molarity, metal ion ($Na^+$ or $Li^+$) mole ratios, and ion conductivity were measured and are shown in Table 1.

TABLE 1

| Types of metal salts | Molality (m) | $Na^+(Li^+)$/water mole ratio | Ion conductivity (mS cm$^{-1}$) |
|---|---|---|---|
| LiTFSI | 21 | 0.38:1 | 10 or less |
| NaNO$_3$ | 10.7 | 0.19:1 | 190 |
| NaCF$_3$SO$_3$ | 9.26 | 0.17:1 | 50 |
| NaClO$_4$ | 17 | 0.31:1 | 108 |

Referring to Table 1, when the molarity of LiTFSl, a conventional imide-based solute, was 21 m, the Li/water molar ratio was high but the ion conductivity was considerably low. On the other hand, in the case of NaNO$_3$, NaCF$_3$SO$_3$, and NaClO$_4$, even though the molarity was small compared with LiTFSI, the ionic conductivity was increased at least by 4 times, and up to 100 times.

Therefore, from the results of Table 1, when using metal salts such as NaNO$_3$, NaCF$_3$SO$_3$, and NaClO$_4$, the aqueous electrolyte solutions exhibit improved ion conductivity.

Preparation Example 1

NaClO$_4$ was dissolved at a concentration of 17 m in deionized water (DI water) to prepare an aqueous electrolyte solution according to Preparation Example 1.

Preparation Example 2

NaClO$_4$ was dissolved at a concentration of 10 m in deionized water (DI water) to prepare an aqueous electrolyte solution according to Preparation Example 2.

Preparation Example 3

NaClO$_4$ was dissolved at a concentration of 5 m in deionized water (DI water) to prepare an aqueous electrolyte solution according to Preparation Example 3.

Preparation Example 4

NaCF$_3$SO$_3$ was dissolved at a concentration of 9.26 m in deionized water (DI water) to prepare an aqueous electrolyte solution according to Preparation Example 4.

Comparative Preparation Example 1

NaClO$_4$ was dissolved at a concentration of 1 m in deionized water (DI water) to prepare an aqueous electrolyte solution according to Comparative Preparation Example 1.

Comparative Preparation Example 2

LiTFSl was dissolved at a concentration of 21 m in deionized water (DI water) to prepare an aqueous electrolyte solution according to Comparative Preparation Example 2.

Evaluation 1

Figure 2:
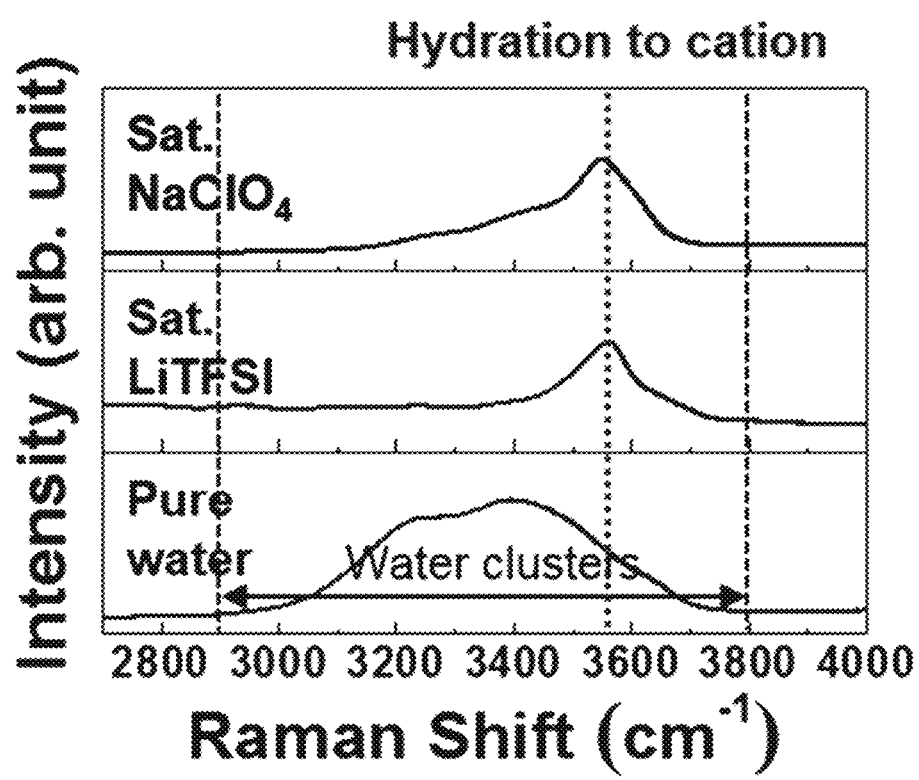
FIG. 2 is a graph showing Raman bands in a band range of 2,700 $cm^{-1}$ to 4,000 $cm^{-1}$ for the aqueous electrolyte solutions according to Preparation Example 1 and Comparative Preparation Example 2 and pure water.

The aqueous electrolyte solution according to Preparation Example 1, the aqueous electrolyte solution according to Comparative Preparation Example 2, and pure water (reference) were respectively measured with respect to Raman bands in a range of 2,700 cm$^{-1}$ to 4,000 cm$^{-1}$ by using Raman spectroscopy, and the results are shown in FIG. 2.

The Raman spectroscopy was conducted by using capillary tubes (inner diameter: 1.1 to 1.2 mm) having a continuous wave linearly polarized laser wavelength of 532 nm.

Specifically, FIG. 2 exhibited a spectrum of an O—H stretching vibration mode of water molecules, and referring to FIG. 2, the aqueous electrolyte solutions according to Preparation Example 1 and Comparative Preparation Example 2 exhibited a sharp peak at a particular band, that is, about 3,550 cm$^{-1}$. On the contrary, the pure water exhibited a broad peak due to symmetric (about 3,200 cm$^{-1}$) and asymmetric (about 3,400 cm$^{-1}$) O—H stretching vibration modes of the water molecules. In other words, as for the aqueous electrolyte solution including a solute such as NaClO$_4$ or LiTFSl in FIG. 2, when the solute was present at a particular concentration or higher, the solute interacted with the water molecules and thus showed a particular structure differing from that of a pure state.

Figure 3:
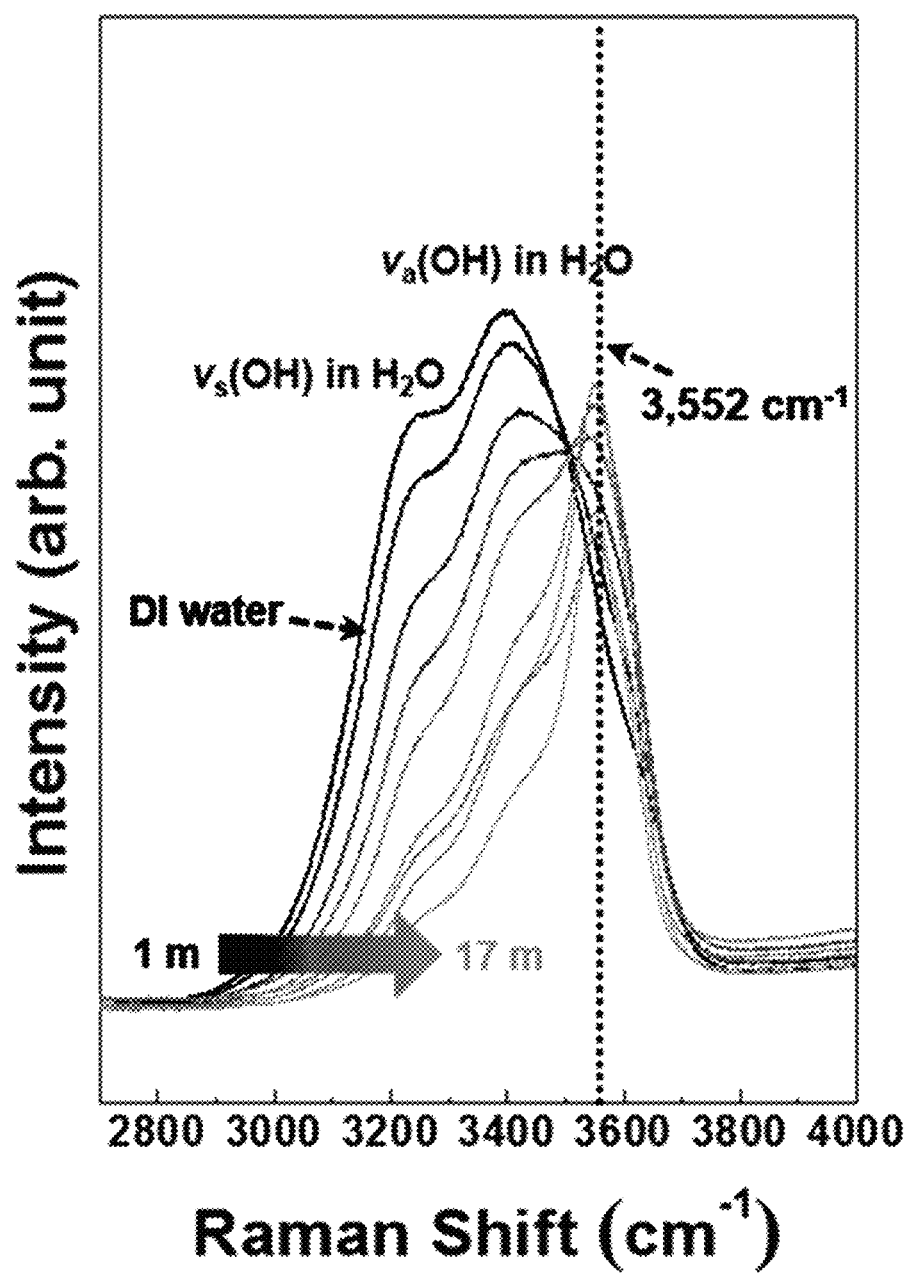
FIG. 3 is a graph showing changes of Raman bands in a band range of 2,700 $cm^{-1}$ to 4,000 $cm^{-1}$ according to a molarity change of the aqueous electrolyte solution including $NaClO_4$.

On the other hand, FIG. 3 is a graph showing a Raman band change in a range of 2,700 cm$^{-1}$ to 4,000 cm$^{-1}$ depending on a molarity change of the aqueous electrolyte solution including NaClO$_4$.

Referring to FIG. 3, as for the aqueous electrolyte solution including NaClO$_4$, as the molarity of the aqueous electrolyte solution increased (from 1 m to 17 m), an O—H stretching vibration band was greatly changed, and as the broad band gradually disappeared, a sharp peak appeared around about 3,550 cm$^{-1}$.

Accordingly, referring to the results of Evaluation 1, as for the aqueous electrolyte solution including NaClO$_4$ at predetermined molarity or higher, hydrogen bands among bulky water molecules were broken, and thus the crystalline hydrate was formed.

Evaluation 2

Figure 4:
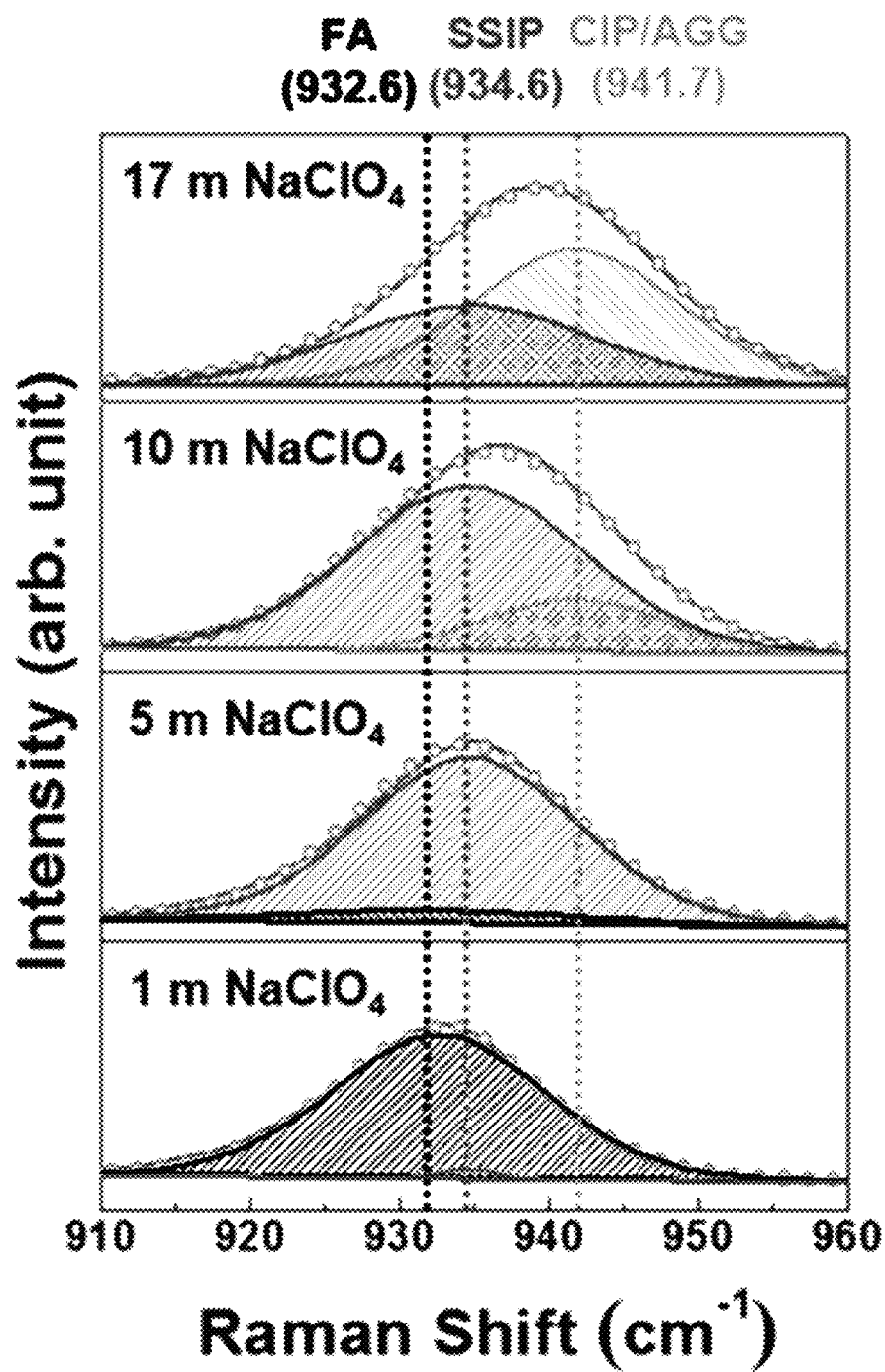
FIG. 4 is a graph showing Raman bands in a band range of 910 $cm^{-1}$ to 960 $cm^{-1}$ of the aqueous electrolyte solutions according to Preparation Examples 1 to 3 and Comparative Preparation Example 1.

The aqueous electrolyte solutions according to Preparation Examples 1 to 3 and Comparative Preparation Example 1 were respectively measured with respect to Raman bands in a range of 910 cm$^{-1}$ to 960 cm$^{-1}$ by using Raman spectroscopy, and the results are shown in FIG. 4.

On the other hand, in each aqueous electrolyte solution according to preparation examples, each mole fraction of free anions (FA), solvent-separated ion pairs (SSIP), contact ion pairs (CIP), and/or aggregated cation-anion pairs (AGG) is shown in Table 2.

TABLE 2

| | FA (932.6 cm$^{-1}$) | SSIP (934.6 cm$^{-1}$) | CIP/AGG (941.7 cm$^{-1}$) |
|---|---|---|---|
| Comparative Preparation Example 1 | 77.2% | 22.8% | 0 |
| Preparation Example 3 | 20.1% | 79.9% | 0 |
| Preparation Example 2 | 0 | 72.6% | 27.4% |
| Preparation Example 1 | 0 | 42.9% | 57.1% |

Referring to FIG. 4 and Table 2, as for the aqueous electrolyte solutions, as molarity increased, the free anions (FA) in the aqueous electrolyte solutions greatly decreased, but the solvent-separated ion pairs (SSIP), the contact ion pairs (CIP), and/or the aggregated cation-anion pairs (AGG) increased. In addition, as for the aqueous electrolyte solutions according to preparation examples, as molarity increased, SSIP decreased, but CIP/AGG increased.

Referring to the results of FIG. 4 and Table 2, as the aqueous electrolyte solutions had predetermined molarity, free water among the water molecules decreased, and a proportion of bound water that is highly ionized with Na$^+$ and/or ClO$_4^-$ ions was increased. In other words, as molarity of the aqueous electrolyte solutions increased beyond the predetermined concentration, the Na$^+$ and/or ClO$_4^-$ ions broke hydrogen bonds among bulky water molecules, but instead formed the crystalline hydrate.

Example 1

A three-electrode half-cell including a positive electrode including Na$_4$Fe$_3$(PO$_4$)$_2$(P$_2$O$_7$) as a positive active material, a separator, a negative electrode including activated carbon, and a reference electrode (SCE) was prepared.

Na$_4$Fe$_3$(PO$_4$)$_2$(P$_2$O$_7$) was synthesized by the following process.

Stoichiometric quantities of Na$_4$P$_2$O$_7$ (95%, Aldrich Corporation), FeC$_2$O$_4$.2H$_2$O (99%, Aldrich Corporation), and NH$_4$H$_2$PO$_4$ (98%, Aldrich Corporation) were mixed using high-energy ball milling (Pulverisette 5, FRITSCH) at 400 rpm for 12 hours. During the high-energy ball milling, pyromellitic acid (PA) (C$_{10}$H$_6$O$_2$, 96%, Alfa Aesar) was added in a weight ratio of the positive active material: PA=95:5.

Then, the mixture was calcined at 300° C. for 6 hours under flowing argon (Ar), and was manually pelletized under a 200 kg/cm$^2$ pressure using a disk-shaped mold. The obtained pellets were sintered again at 550° C. for 12 hours under flowing Ar to prepare a positive active material.

Then, a mixture of the prepared positive active material: Super P carbon black:polytetrafluoroethylene (PTFE) binder in a weight ratio of 7:2:1 was compressed on a stainless steel grid to manufacture a positive electrode.

Meanwhile, NaTi$_2$(PO$_4$)$_3$ as a negative active material was synthesized as follows.

Stoichiometric amounts of DeletedTexts (98%, Aldrich Corporation), TiO$_2$ (99.7%, anatase phase, Aldrich Corporation), and (NH$_4$)$_2$HPO$_4$ (98%, Aldrich Corporation) were mixed in acetone for 24 hours. Then, the mixture was evaporated at 70° C. for 12 hours to remove acetone.

The homogeneously mixed powder was sintered at 300° C. for 6 hours under flowing Ar. The calcined powder was manually pelletized under a 200 kg/cm$^2$ pressure using a disk-shaped mold. Then, the pellets were then heated again at 900° C. for 24 hours in air to prepare a negative active material.

Then, a mixture of the prepared negative active material: Super P carbon black:polytetrafluoroethylene (PTFE) binder in a weight ratio of 8:1:1 was compressed on a stainless steel grid to manufacture a negative electrode.

Thereafter, the aforementioned positive electrode, separator, negative electrode, and reference electrode were disposed in a half cell housing, and the aqueous electrolyte solution according to Preparation Example 1 described above was filled to prepare a coin-cell according to Example 1.

Example 2

A half-cell according to Example 2 was manufactured according to the same method as Example 1, except that the aqueous electrolyte solution according to Preparation Example 2 was used instead of the aqueous electrolyte solution according to Preparation Example 1.

Example 3

A half-cell according to Example 3 was manufactured according to the same method as Example 1, except that the aqueous electrolyte solution according to Preparation Example 3 was used instead of the aqueous electrolyte solution according to Preparation Example 1.

Example 4

A half-cell according to Example 4 was manufactured according to the same method as Example 1, except that the aqueous electrolyte solution according to Preparation Example 4 was used instead of the aqueous electrolyte solution according to Preparation Example 1.

Comparative Example 1

A half-cell according to Comparative Example 1 was manufactured according to the same method as Example 1, except that the aqueous electrolyte solution according to Comparative Preparation Example 1 was used instead of the aqueous electrolyte solution according to Preparation Example 1.

Comparative Example 2

A half-cell according to Comparative Example 2 was manufactured according to the same method as Example 1, except that the aqueous electrolyte solution according to Comparative Preparation Example 2 was used instead of the aqueous electrolyte solution according to Preparation Example 1.

Evaluation 3

The half cells according to Example 1 and Comparative Example 1 were charged/discharged for 20 cycles at a 1 C rate, and then the surfaces of the negative electrodes were measured with TEM and treated with EELS elemental mapping, and the results are shown in FIGS. 5 to 8.

Figure 5:
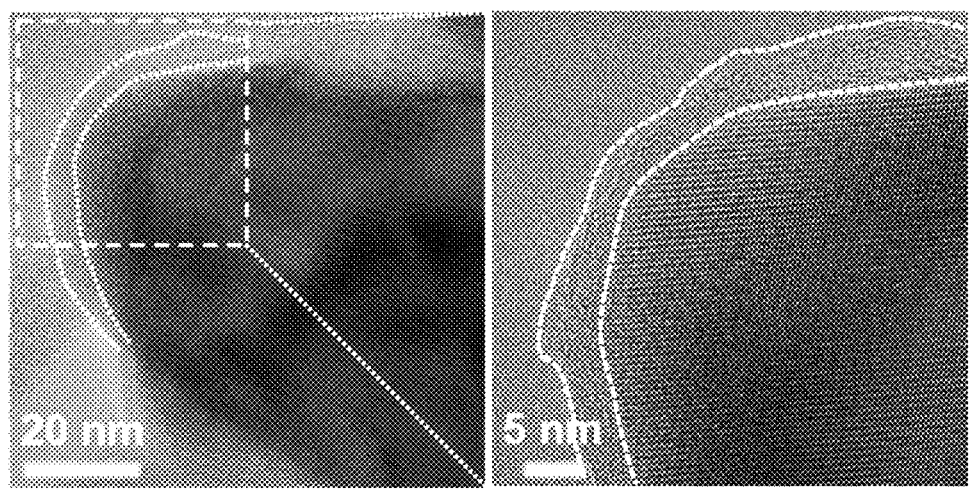
FIG. 5 is a transmission electron microscope (TEM) image showing the surface of the negative electrode after performing 20 cycles of charge/discharge of the half-cell according to Example 1, and an enlarged view of a portion thereof.
Figure 6:
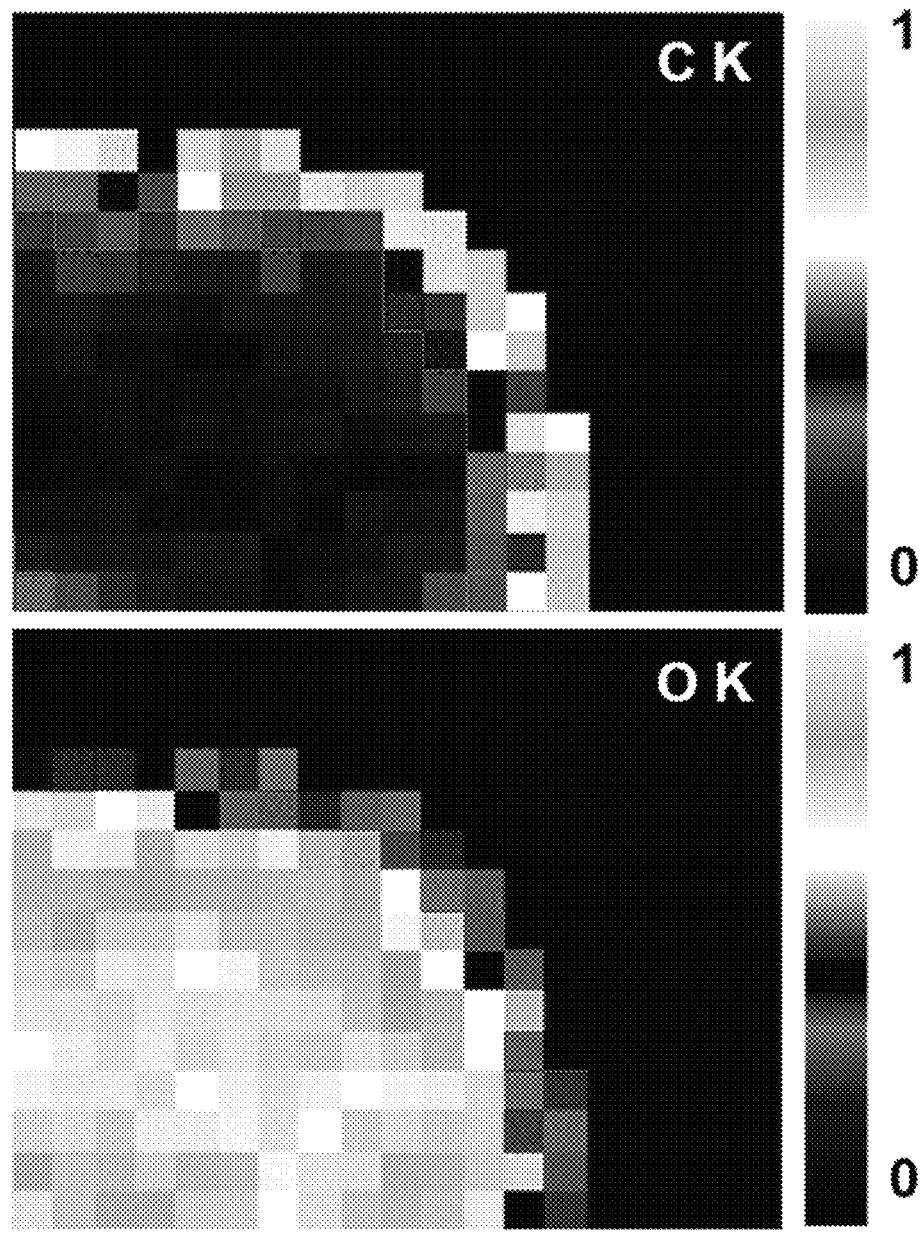
FIG. 6 is an image showing the carbon-K edge and the oxygen-K edge as a result of EELS elemental mapping after 20 cycles of charge/discharge of the half-cell according to Example 1.

FIG. 5 is a TEM (Transmission Electron Microscope) image showing the surface of the negative electrode after performing 20 cycles of charge/discharge of the half-cell according to Example 1, and an enlarged view of a portion thereof, and FIG. 6 is an image showing the carbon-K edge (top) and the oxygen-K edge (bottom), respectively, as a result of EELS elemental mapping after 20 cycles of charge/discharge of the half-cell according to Example 1.

Figure 7:
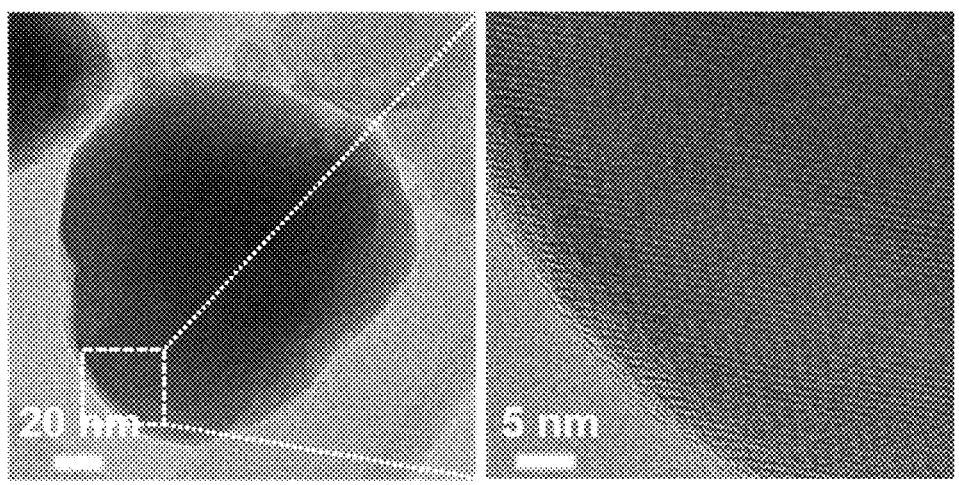
FIG. 7 is a TEM (Transmission Electron Microscope) image showing the surface of the negative electrode after performing 20 cycles of charge/discharge of the half-cell according to Comparative Example 1, and enlarged view of a portion thereof.
Figure 8:
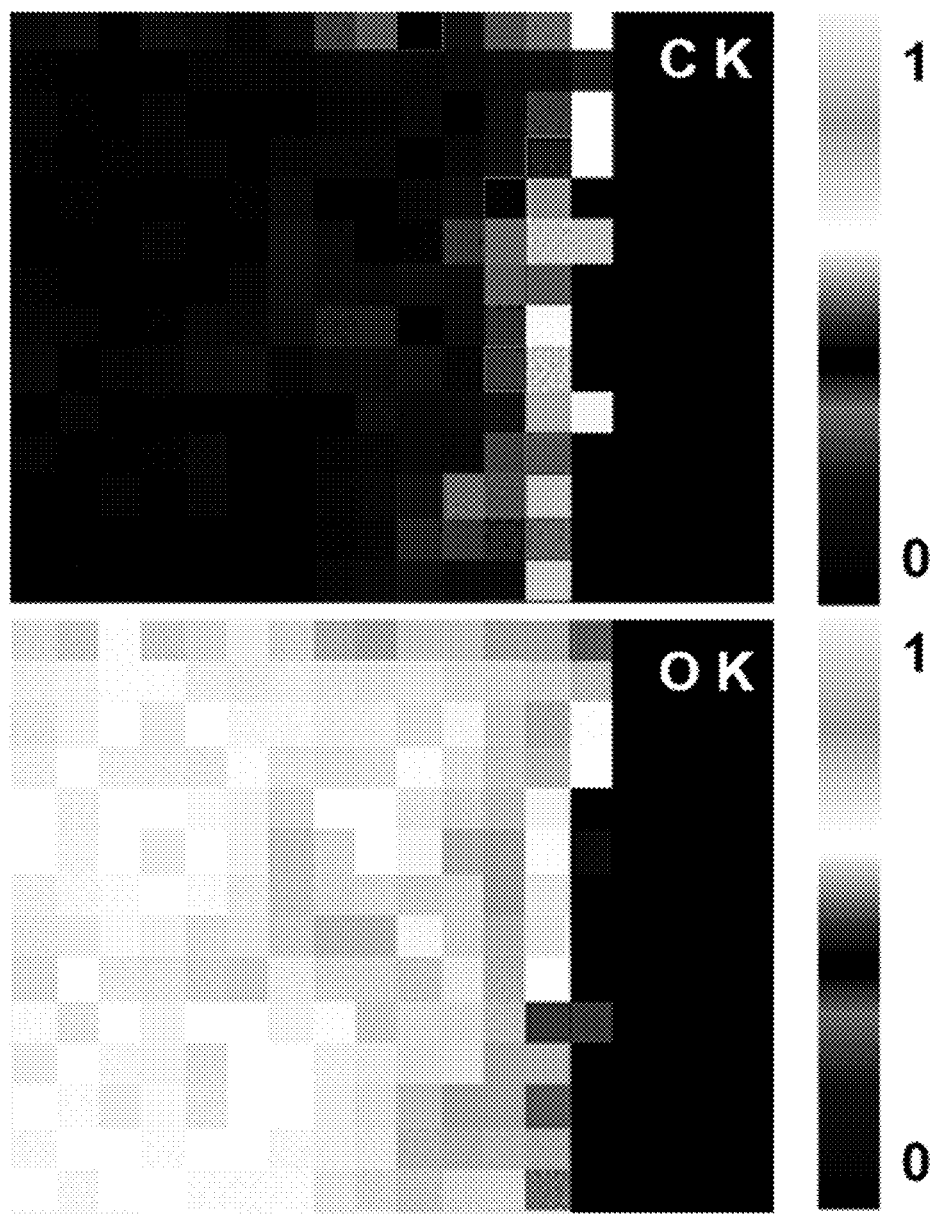
FIG. 8 is an image showing the carbon-K edge and the oxygen-K edge as a result of EELS elemental mapping after 20 cycles of charge/discharge of the half-cell according to Comparative Example 1.

FIG. 7 is a TEM (Transmission Electron Microscope) image showing the surface of the negative electrode after performing 20 cycles of charge/discharge of the half-cell according to Comparative Example 1, and an enlarged view of a portion thereof, and FIG. 8 is an image showing the carbon-K edge (top) and the oxygen-K edge (bottom) as a result of EELS elemental mapping after 20 cycles of charge/discharge of the half-cell according to Comparative Example 1.

First, referring to FIGS. 5 to 6, as for the half-cell according to Example 1, an SEI film having an average thickness of about 1 nm to about 5 nm was formed on the surface of the negative electrode. In addition, a thin carbon coating layer was formed on the surface of the negative electrode from a carbon-K edge of the half-cell of Example 1, and a thin layer including oxygen was present from an oxygen-K edge on the surface of the negative electrode.

On the contrary, referring to FIGS. 7 to 8, as for the half cell according to Comparative Example 1, a separate SEI film was not formed on the surface of the negative electrode, which may be confirmed from the carbon-K edge and the oxygen-K edge of the half-cell according to Comparative Example 1.

Accordingly, referring to the results of FIGS. 5 to 8, when the aqueous electrolyte solution included a predetermined metal salt but did not include it with predetermined molarity or higher, the SEI film was not smoothly formed.

Figure 9:
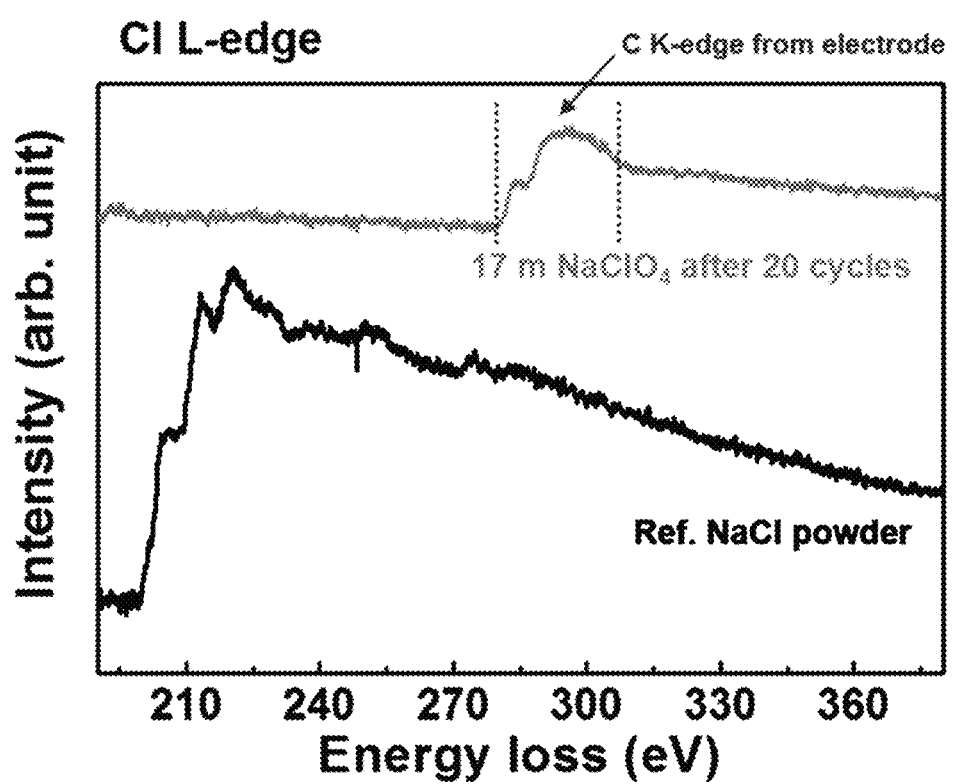
FIG. 9 is a Cl L-edge graph of the EELS showing the surface of the negative electrode after performing 20 cycles of charge/discharge of the half-cell according to Example 1.

Meanwhile, FIG. 9 is a Cl L-edge graph of the EELS showing the surface of the negative electrode after performing 20 cycles of charge/discharge of the half-cell according to Example 1.

Referring to FIG. 9, the surface of the negative electrode of the half-cell according to Example 1 shows a different profile from a graph profile of sodium chloride (NaCl) as a reference. In other words, referring to FIG. 9, as for the half-cell of Example 1, the SEI film formed on the surface of the negative electrode included no Cl.

Figure 10:
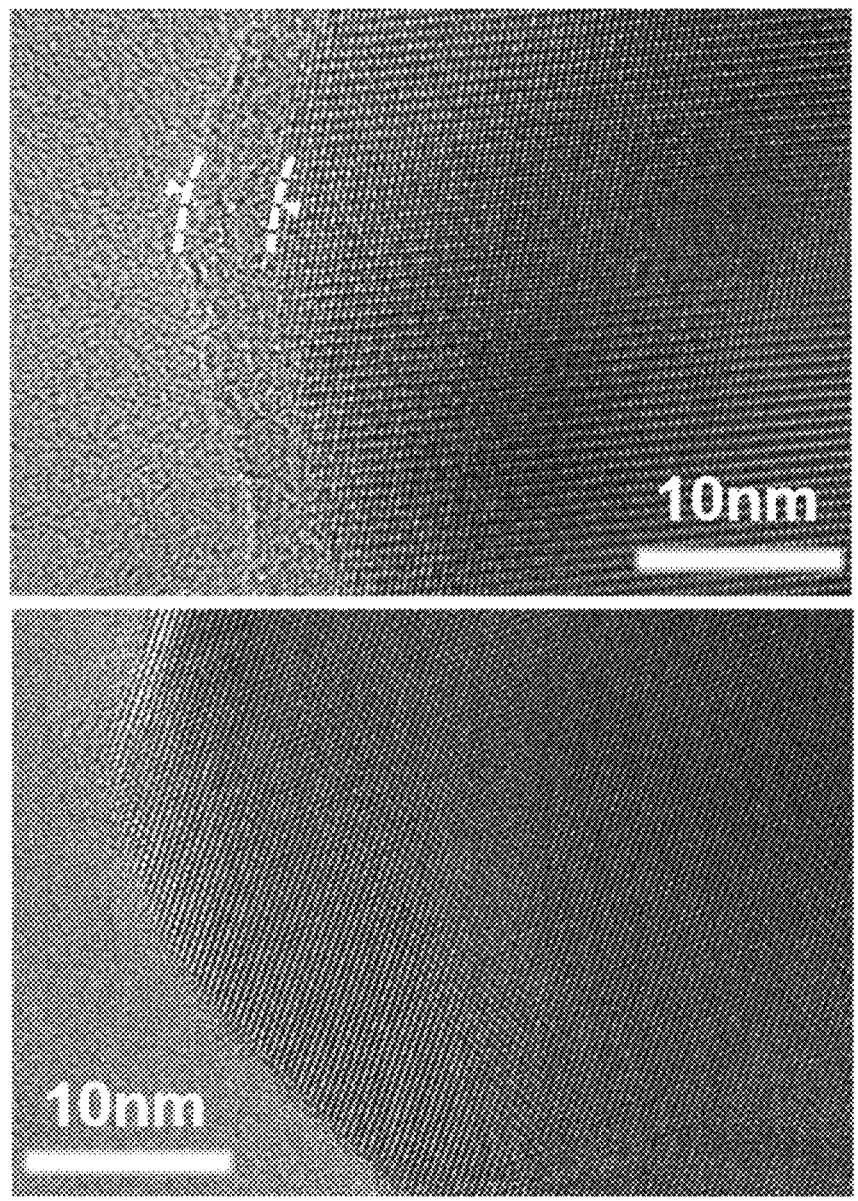
FIG. 10 is a TEM (Transmission Electron Microscope) image showing before (top) and after (bottom) washing the surface of the negative electrode with DI water after performing 20 cycles of charge/discharge of the half-cell according to Example 1.

Meanwhile, FIG. 10 is a TEM (Transmission Electron Microscope) image showing before (top) and after (bottom) washing the surface of the negative electrode with DI water after performing 20 cycles of charge/discharge of the half-cell according to Example 1.

Referring to FIG. 10, on the surface of the negative electrode of the half-cell according to Example 1, an SEI film having a predetermined thickness was found before washing but almost not found after the washing. Accordingly, referring to the results of FIG. 10, free water had an influence on hydrolysis of the SEI film.

Evaluation 4

Figure 11:
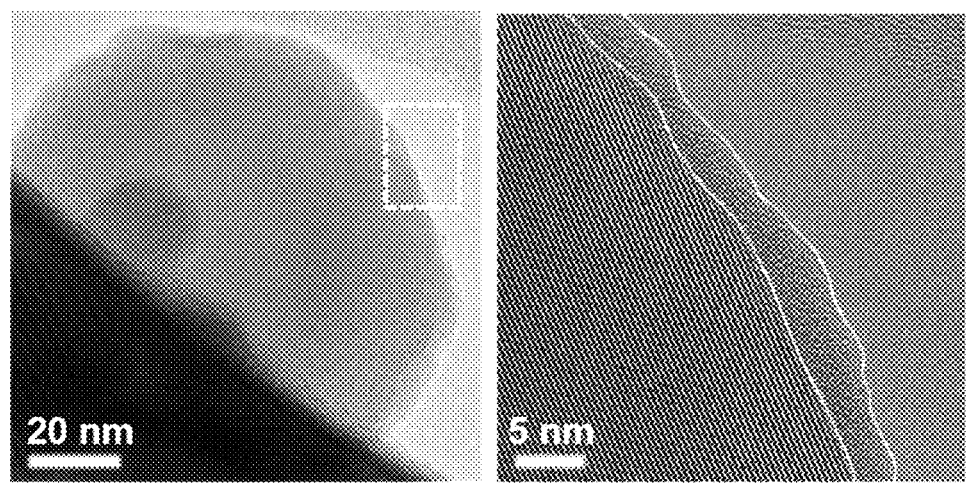
FIG. 11 is a TEM (Transmission Electron Microscope) image showing the surface of the negative electrode after performing 20 cycles of charge/discharge of the half-cell according to Example 4, and an enlarged view of a portion thereof.

The half-cell of Example 4 was charged/discharged for 20 cycles at a 1 C rate, the surface of the negative electrode was measured with TEM, and the result is shown in FIG. 11.

FIG. 11 is a TEM (Transmission Electron Microscope) image showing the surface of the negative electrode after performing 20 cycles of charges/discharges of the half-cell according to Example 4 and an enlarged view of a portion thereof.

Referring to FIG. 11, even though a type of metal salt included in the aqueous electrolyte solution was changed from $NaClO_4$ to $NaCF_3SO_3$, an SEI film was well formed on the surface of the negative electrode. Accordingly, referring to the result of Evaluation 4, even though a type of metal salt included in the aqueous electrolyte solution is changed from $NaClO_4$ to $NaCF_3SO_3$, a desired result of the present invention (formation of a SEI film on the surface of the negative electrode) may be still obtained.

Evaluation 5

Figure 12:
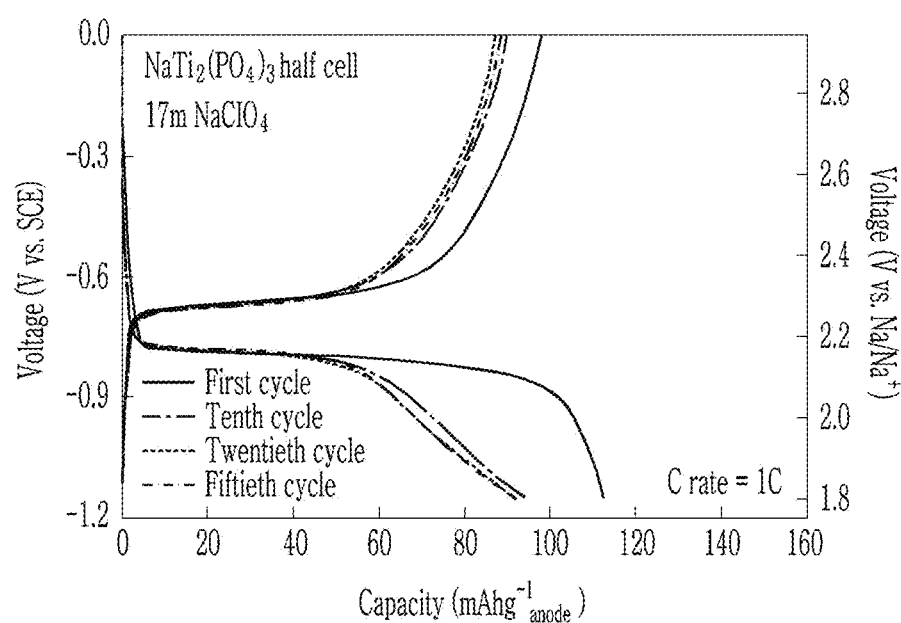
FIG. 12 is a graph showing a negative electrode voltage vs. a capacity during the first cycle charge/discharge to $50^{th}$ cycle charge/discharge of the half-cell according to Example 1.

The half-cell according to Example 1 was charged/discharged at a 1 C rate from the first cycle to the $50^{th}$ cycle, and the results are shown in FIG. 12.

FIG. 12 is a graph showing a negative electrode voltage vs. a capacity during the first cycle charge/discharge to the $50^{th}$ cycle charge/discharge of the half-cell according to Example 1.

Referring to FIG. 12, the negative electrode capacity at the $10^{th}$ cycle charge/discharge greatly tended to decrease compared with the negative electrode voltage at the $1^{st}$ charge/discharge, but the voltages vs. negative electrode capacities during the charges/discharges from the $10^{th}$ cycle to the $50^{th}$ cycle were almost not changed.

Accordingly, referring to the result of FIG. 12, a reaction at the $1^{st}$ charge/discharge differed from those at the following cycles, and when examined with Evaluation 4, the different reaction may be easily regarded to be a reaction of forming the SEI film on the surface of the negative electrode.

Figure 13:
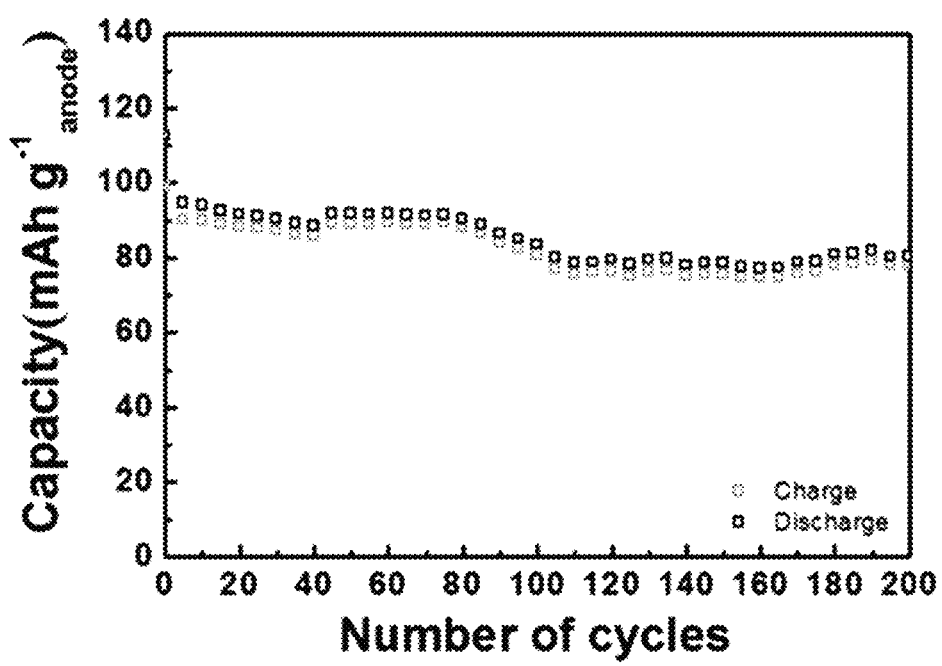
FIG. 13 is a graph showing a negative electrode capacity vs. cycles of the half-cell according to Example 1.

Meanwhile, FIG. 13 is a graph showing a negative electrode capacity vs. cycles of the half-cell according to Example 1.

Referring to FIG. 13, as cycles of the half-cells were increased, negative electrode capacity in general tended to decrease a little, but considering the $200^{th}$ cycle charge/discharge condition, negative electrode capacity (about 80 mAh/g) at the $200^{th}$ cycle charge/discharge did not show a large difference from the negative electrode capacity (about 100 mAh/g) at the $2^{nd}$ cycle charge/discharge.

Accordingly, referring to the results of FIG. 13, the half-cell of Example 1 exhibited stable charge/discharge characteristics and cycle-life characteristics.

Evaluation 6

Figure 14:
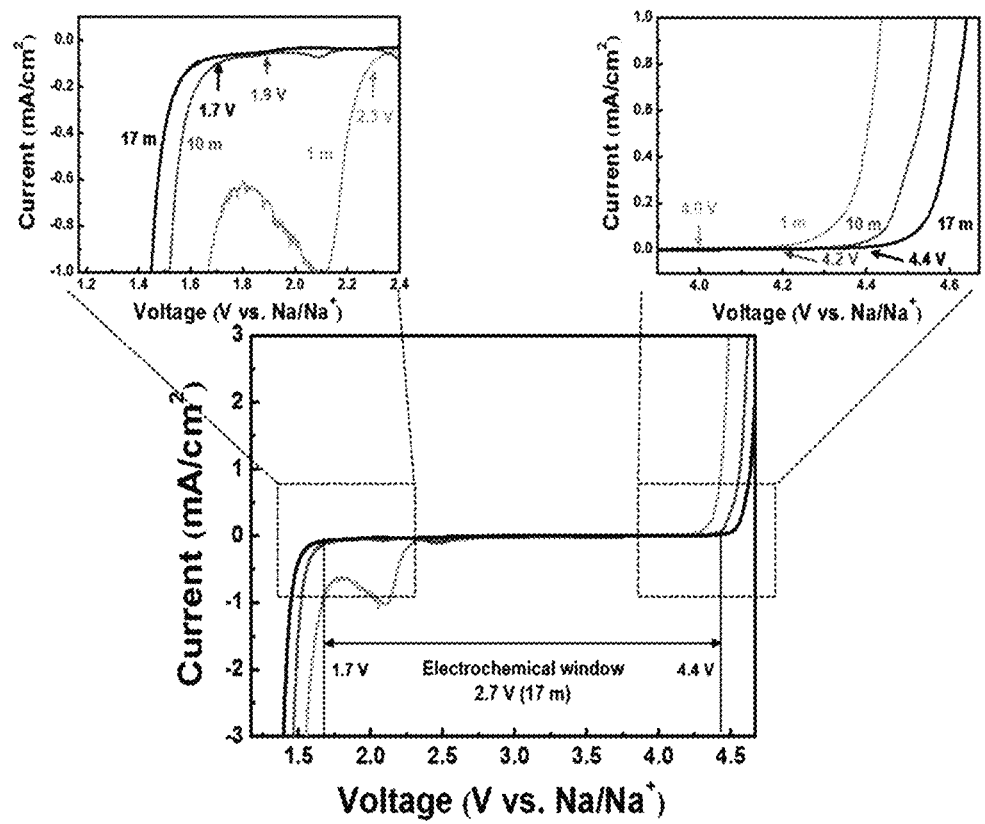
FIG. 14 is a graph showing current vs. voltage obtained by cyclic voltammetry using the aqueous electrolyte solutions according to Preparation Example 1 and Preparation Example 2, and Comparative Preparation Example

A gold (Au) electrode used as a working electrode, SCE used as a reference electrode, and a platinum (Pt) electrode used as an opposed electrode formed a three electrode system, and in addition, each aqueous electrolyte solution according to Preparation Examples 1 and 2 and Comparative Preparation Example 1 were used to measure voltage vs. current through cyclic voltammetry (CV) and thus obtain each electrochemical stability window, and the results are shown in FIG. 14.

Referring to FIG. 14, the cell using the aqueous electrolyte solution according to Preparation Example 1 had an electrochemical stability window in a voltage range of 1.7 V to 4.4 V, which has a wide width of 2.7 V. The cell using the aqueous electrolyte solution of Preparation Example 2 had an electrochemical stability window in a little narrower voltage range (1.9 V to 4.2 V) than the cell using the aqueous electrolyte solution of Preparation Example 1, but the difference was about 2.3 V, which was a relatively excellent width. On the contrary, the cell using the aqueous electrolyte solution according to Comparative Preparation Example 1 had an electrochemical stability window of 2.3 V to 4.0 V which had a width of 1.7 V and thus was narrower than those of the cells using the aqueous electrolyte solutions according to Preparation Examples 1 and 2.

Accordingly, referring to the results of Evaluation 6, even though a homogeneous metal salt is used, electrochemical stability of an aqueous secondary battery cell may be improved by adjusting molarity.

Evaluation 7

Figure 15:
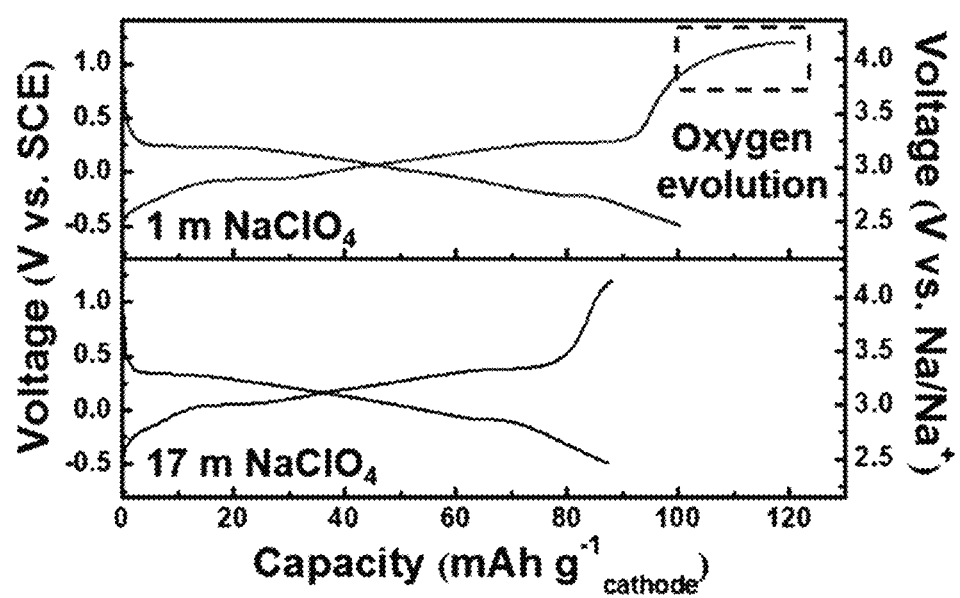
FIG. 15 is a graph illustrating voltages of positive electrode capacities of half-cells according to Example 1 and Comparative Example 1.
Figure 16:
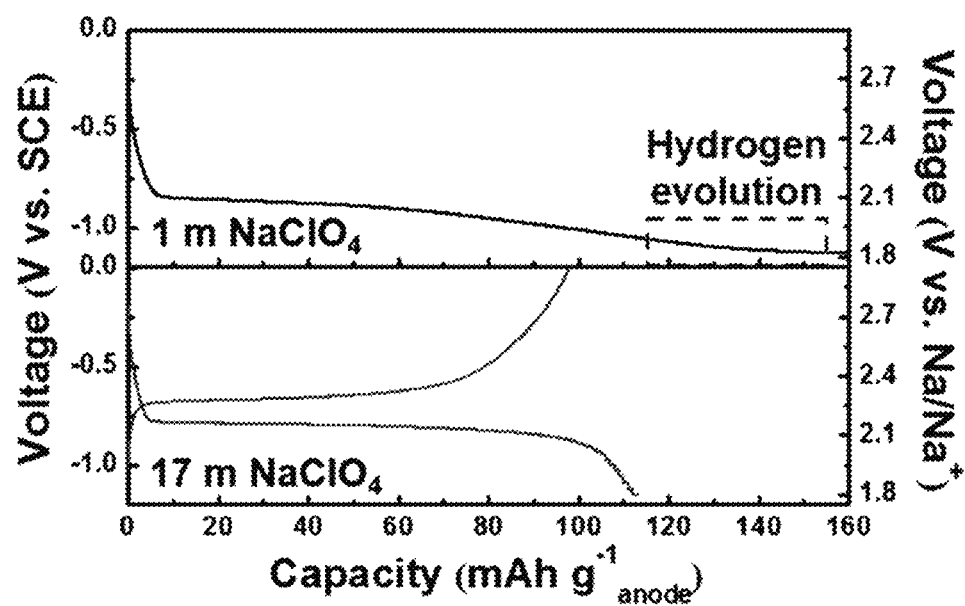
FIG. 16 is a graph illustrating voltages of negative electrode capacities of half-cells according to Example 1 and Comparative Example 1.

The half-cells according to Example 1 and Comparative Example 1 were charged/discharged at a 1 C rate at the $1^{st}$ cycle, and the results are shown as graphs in FIGS. 15 to 16.

FIG. 15 is a graph illustrating voltages of positive electrode capacities of the half-cells according to Example 1 and Comparative Example 1, and FIG. 16 is a graph illustrating voltages of negative electrode capacities of the half-cells according to Example 1 and Comparative Example 1.

Referring to FIGS. 15 and 16, the half-cell according to Example 1 exhibited excellent reversibility at the positive electrode (FIG. 15) and the negative electrode (FIG. 16) during the charge/discharge. On the contrary, Comparative Example 1 exhibited each side reaction of generating oxygen at the positive electrode (FIG. 15) and generating hydrogen at the negative electrode (FIG. 16).

Accordingly, referring to the results of Evaluation 7, the half-cell according to Example 1 was expected to exhibit excellent electrochemical activity, but the half-cell according to Comparative Example 1 exhibited deteriorated charge/discharge efficiency due to the side reactions and thus is expected not to work as an electrochemical device.

Example 5

The positive and negative electrodes according to Example 1 were used to manufacture a full cell.

Specifically, the positive electrode, the negative electrode, and the separator described in Example 1 were respectively disposed in a housing for a full cell, and the aqueous electrolyte solution according to Preparation Example 1 was filled therein to manufacture a full-cell according to Example 5.

Example 6

A full-cell according to Example 6 was manufactured according to the same method as Example 5, except that the aqueous electrolyte solution according to Preparation Example 4 was used instead of the aqueous electrolyte solution according to Preparation Example 1.

Comparative Example 3

A full-cell according to Comparative Example 3 was manufactured according to the same method as Example 5, except that the aqueous electrolyte solution according to Comparative Preparation Example 1 was used instead of the aqueous electrolyte solution according to Preparation Example 1.

Evaluation 8

Figure 17:
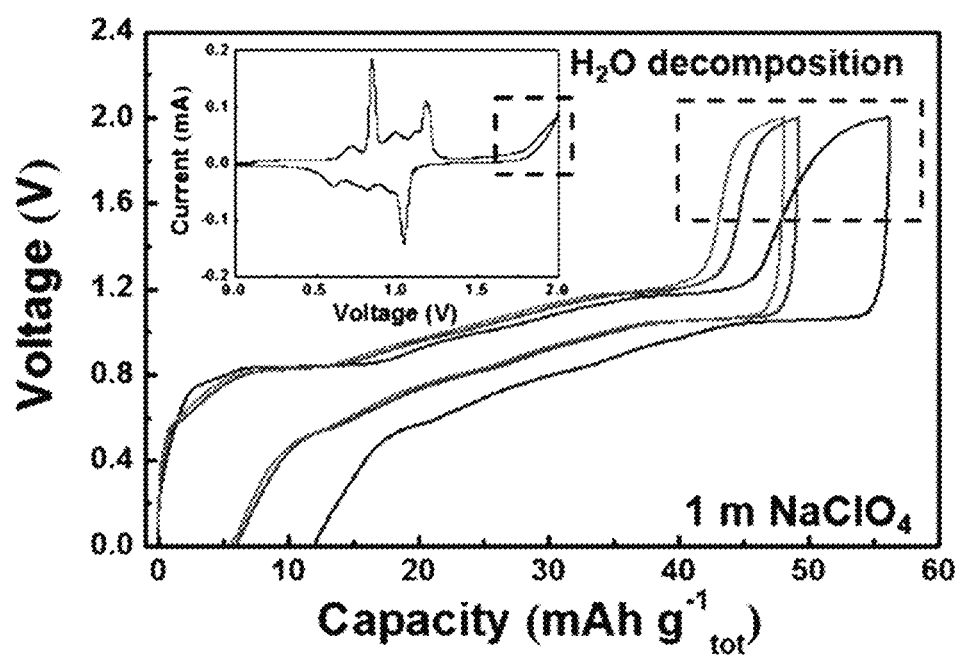
FIG. 17 is a graph illustrating voltages of total capacities of the full-cell according to Comparative Example 3.
Figure 18:
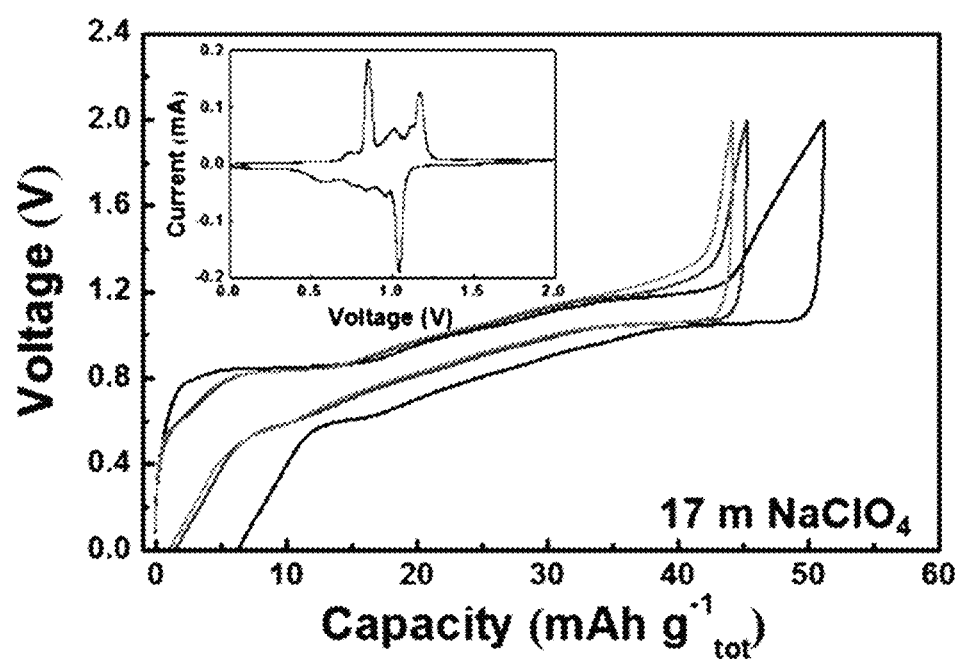
FIG. 18 is a graph illustrating voltages of total capacities of the full-cell according to Example 5.

The full-cells according to Example 5 and Comparative Example 3 were charged/discharged at a 1 C rate for the $1^{st}$ cycle, and the results are shown as a graph respectively in FIGS. 17 and 18.

FIG. 17 is a graph illustrating voltages of total capacities of the full-cell according to Comparative Example 3, and FIG. 18 is a graph illustrating voltages of total capacities of the full-cell according to Example 5.

Referring to FIGS. 17 and 18, Example 5 exhibited excellent reversible charge/discharge characteristics compared with Comparative Example 1, and Comparative Example 3 exhibited continuously deteriorated capacity characteristics due to decomposition of water in the aqueous electrolyte solution as charges/discharges were performed.

Accordingly, referring to the result of Evaluation 8, even though a predetermined metal salt was included, when included in an amount of predetermined molarity or higher, an aqueous secondary battery call exhibited stable charge/discharge characteristics.

Evaluation 9

Figure 19:
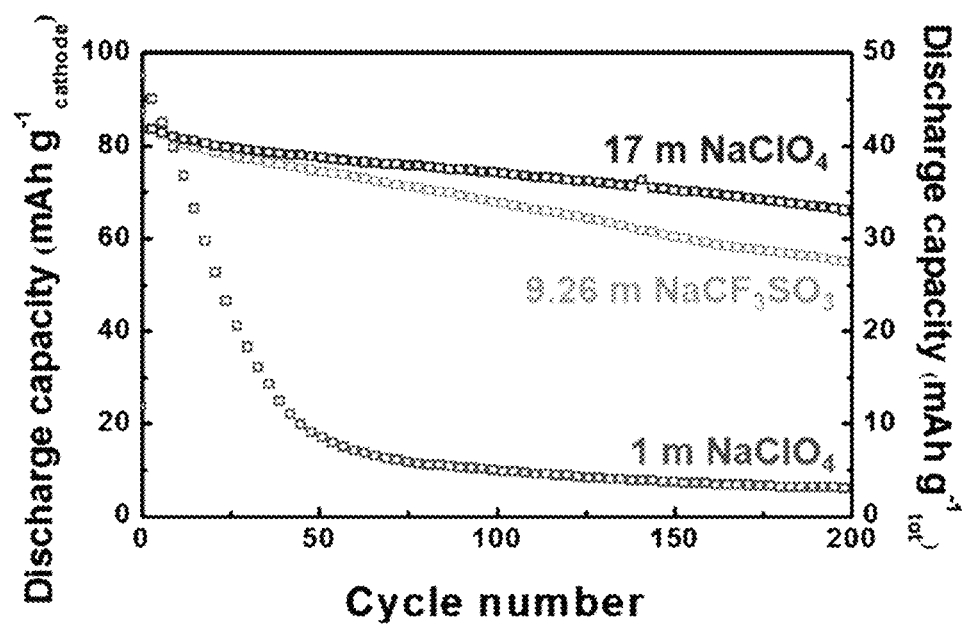
FIG. 19 is a graph showing the positive electrode discharge capacity vs. the cycles of the full-cells according to Examples 5 and 6 and Comparative Example 3.

The full-cells according to Examples 5 and 6 and Comparative Example 3 were measured with respect to discharge capacity of the positive electrodes at each cycle while the charges/discharges were performed up to the $200^{th}$ cycle, and the results are shown in FIG. 19.

FIG. 19 is a graph showing the positive electrode discharge capacity vs. the cycles of the full-cells according to Examples 5 and 6 and Comparative Example 3.

Referring to FIG. 19, the full-cells according to Examples 5 and 6 used each aqueous electrolyte solution having different molarities and a different type of metal salt, and exhibited excellent stable charge/discharge characteristics and cycle-life characteristics compared with the full-cell according to Comparative Example 3. As for Comparative Example 3, discharge capacity of the positive electrode was sharply deteriorated down to less than or equal to about 20 mAh/g up to the initial 50 cycles.

Accordingly, referring to the results of Evaluation 9, even though a predetermined metal salt was included, when included in an amount of predetermined molarity or higher, an aqueous secondary battery cell exhibited stable cycle charge/discharge characteristics and cycle-life characteristics.

Evaluation 10

Figure 20:
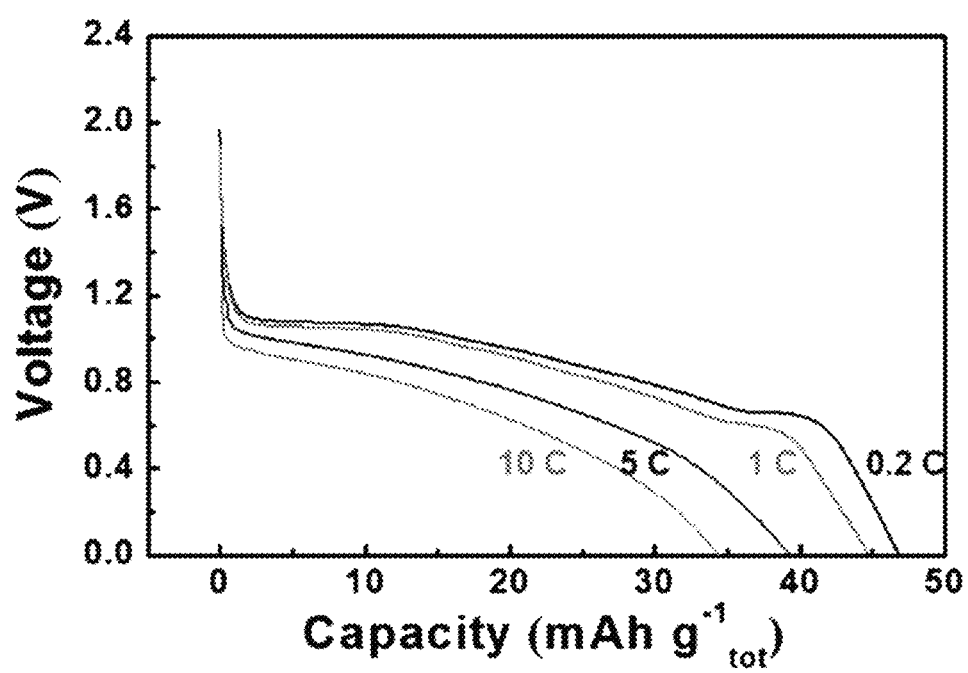
FIG. 20 is a graph showing a voltage versus total capacity of the full-cell according to Example 5.

The full-cell according to Example 5 was measured with respect to a relationship between capacity (at 0.2 C, 1 C, 5 C, and 10 C) and a voltage while a rate was respectively differently adjusted, and the results are shown in FIG. 20.

FIG. 20 is a graph showing a voltage versus total capacity of the full-cell according to Example 5.

Referring to FIG. 20, the full-cell according to Example 5 exhibited no large difference in a general charge/discharge mechanism, even though the rate was changed. Specifically, even though a rate of an aqueous secondary battery cell according to an embodiment was increased (e.g., a high rate charge, an ultrahigh rate charge, and the like), performance deterioration depending on the rate was not large, which is based on improved excellent ion conductivity.

Accordingly, referring to the result of Evaluation 10, the aqueous secondary battery cell according to an embodiment may be variously designed according to various charge rates.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. An aqueous secondary battery as a sodium secondary battery comprising
    a positive electrode comprising at least one positive active material selected from the group consisting of $Na_4Fe_3(PO_4)_2(P_2O_7)$, $Na_4MnFe_2(PO_4)_2(P_2O_7)$, $Na_4Mn_2Fe(PO_4)_2(P_2O_7)$ and $Na_4Mn_3(PO_4)_2(P_2O_7)$;
    a negative electrode comprising at least one negative active material selected from the group consisting of a sodium metal, a sodium metal based alloy, and a sodium insertion compound;
    a separator; and
    an aqueous electrolyte solution comprising water and $NaClO_4$ and having molality greater than 10 m to 40 m,
    wherein the aqueous electrolyte solution comprises a crystalline hydrate, and the crystalline hydrate comprises a portion of a sodium ion and a perchlorate ion from NaClO$_4$ that constitutes a coordination with water molecules, and wherein the sodium ion and the perchlorate ion forming the crystalline hydrate is in form of solvent-separated ion pairs, contact ion pairs and aggregated cation-anion pairs, and a mole fraction of the contact ion pairs relative to the aggregated cation-anion pairs is greater than or equal to about 50% based on a total amount of the sodium ion and the perchlorate ion that are ionized in the aqueous electrolyte solution.

2. The aqueous secondary battery of claim 1, wherein the aqueous electrolyte solution has ion conductivity of greater than or equal to about 40 mS/cm.

3. The aqueous secondary battery of claim 1, wherein when the aqueous secondary battery is charged, a passivation film comprising the sodium ion is formed on the surface of the negative electrode.

4. The aqueous secondary battery of claim 3, wherein the passivation film has an average thickness of about 1 nm to about 10 nm.

5. The aqueous secondary battery of claim 3, wherein the passivation film comprises at least one selected from the group consisting of NaOH and Na$_2$CO$_3$.

6. The aqueous secondary battery of claim 1, wherein an electrochemical stability window of the aqueous secondary battery obtained through cyclic voltammetry belongs to a voltage range of greater than about 1.23 V.

7. The aqueous secondary battery of claim 1, wherein a width of an electrochemical stability window of the aqueous electrolyte solution obtained through cyclic voltammetry is about 1 V to about 4 V.

* * * * *